(12) United States Patent
Lee

(10) Patent No.: US 8,286,909 B2
(45) Date of Patent: Oct. 16, 2012

(54) BOUNDARY LAYER PROPULSION AIRSHIP WITH RELATED SYSTEM AND METHOD

(75) Inventor: Yee-Chun Lee, San Jose, CA (US)

(73) Assignee: StratoComm Corporation, Albany, NY (US)

( * ) Notice: Subject to any disclaimer, the term of this patent is extended or adjusted under 35 U.S.C. 154(b) by 1019 days.

(21) Appl. No.: 12/068,667

(22) Filed: Feb. 8, 2008

(65) Prior Publication Data

US 2009/0200416 A1 Aug. 13, 2009

(51) Int. Cl.
- *B64B 1/30* (2006.01)
- *B64B 1/24* (2006.01)
- *B64C 21/00* (2006.01)
- *B64C 21/10* (2006.01)
- *B64C 11/00* (2006.01)

(52) U.S. Cl. ......... 244/29; 244/30; 244/200; 244/200.1; 244/204; 244/204.1; 244/96; 244/55; 244/65

(58) Field of Classification Search ............. 244/29, 244/30, 31, 24, 204, 204.1, 198, 200, 200.1, 244/201, 96, 55, 62, 65, 73 R See application file for complete search history.

(56) References Cited

U.S. PATENT DOCUMENTS

| | | |
|---|---|---|
| 3,079,106 A | 2/1963 | Whitnah |
| 3,488,019 A | 1/1970 | Sonstegaard |
| 3,599,901 A | 8/1971 | Relkin |
| 3,620,485 A | 11/1971 | Egon |
| 3,779,199 A | 12/1973 | Mayer, Jr. |
| 3,951,360 A | 4/1976 | Anxionnaz |
| 4,085,912 A * | 4/1978 | Slater ............................. 244/25 |
| 4,750,693 A * | 6/1988 | Lobert et al. ................. 244/200 |
| 5,540,406 A | 7/1996 | Occhipinti |
| 5,823,468 A | 10/1998 | Bothe |
| 5,901,928 A | 5/1999 | Raskob, Jr. |
| 5,941,481 A * | 8/1999 | Snarski ......................... 244/204 |
| 5,975,462 A | 11/1999 | Platzer |
| 6,016,992 A | 1/2000 | Kolacny |
| 6,092,766 A * | 7/2000 | LaRoche et al. .............. 244/200 |
| 6,224,016 B1 * | 5/2001 | Lee et al. ......................... 244/30 |
| 6,715,717 B2 * | 4/2004 | Dixon et al. .................. 244/130 |
| 6,837,465 B2 * | 1/2005 | Lisy et al. .................. 244/204.1 |
| 7,070,850 B2 * | 7/2006 | Dietz et al. .................... 428/172 |
| 7,264,202 B2 * | 9/2007 | Sullivan ......................... 244/96 |
| 7,334,760 B1 * | 2/2008 | Lisy et al. ..................... 244/203 |
| 7,878,457 B2 * | 2/2011 | Narramore ................. 244/200.1 |
| 7,891,603 B2 * | 2/2011 | Voorhees ........................ 244/29 |
| 2002/0125376 A1 * | 9/2002 | Karniadakis et al. ......... 244/204 |
| 2004/0046086 A1 * | 3/2004 | Dixon et al. .................. 244/199 |

(Continued)

FOREIGN PATENT DOCUMENTS

GB 479 598 A 7/1936

(Continued)

*Primary Examiner* — Joseph W Sanderson
(74) *Attorney, Agent, or Firm* — Breneman & Georges

(57) ABSTRACT

Systems, method, devices and apparatus are provided for reducing drag and increasing the flight efficiency characteristics of aircraft and airships including hybrid aircraft utilizing distributed boundary layer control and propulsion devices. Boundary layer control includes passive systems such as riblet films and boundary layer propulsion devices having a divided and distributed propulsion system disposed in the curved aft sections of aircraft and airships including hybrid aircraft susceptible to boundary layer drag due to degree of curvatures, speed and density of the surrounding air. Distributed propulsion devices include constructing propellers and riblets from shape memory alloys, piezoelectric materials and electroactive polymer (EAP) materials to change the shape and length of the distributed propulsion device.

24 Claims, 20 Drawing Sheets

U.S. PATENT DOCUMENTS

| | | |
|---|---|---|
| 2005/0173591 A1 | 8/2005 | Colting |
| 2006/0266881 A1 | 11/2006 | Hughey |
| 2006/0266882 A1 | 11/2006 | Kummer et al. |
| 2007/0018056 A1* | 1/2007 | Narramore ................ 244/200.1 |
| 2007/0075184 A1* | 4/2007 | Marimon et al. ............... 244/30 |
| 2007/0222344 A1 | 9/2007 | Kornbluh et al. |
| 2008/0128560 A1* | 6/2008 | Hyde et al. .................... 244/203 |
| 2008/0217485 A1* | 9/2008 | Ikeda ........................ 244/204.1 |

FOREIGN PATENT DOCUMENTS

| | | |
|---|---|---|
| GB | 6 106 222 A | 10/1948 |
| GB | 881570 A | 11/1961 |
| GB | 1 019 359 A | 2/1966 |
| GB | 1112924 A | 5/1968 |
| GB | 1 281 899 A | 7/1972 |

* cited by examiner

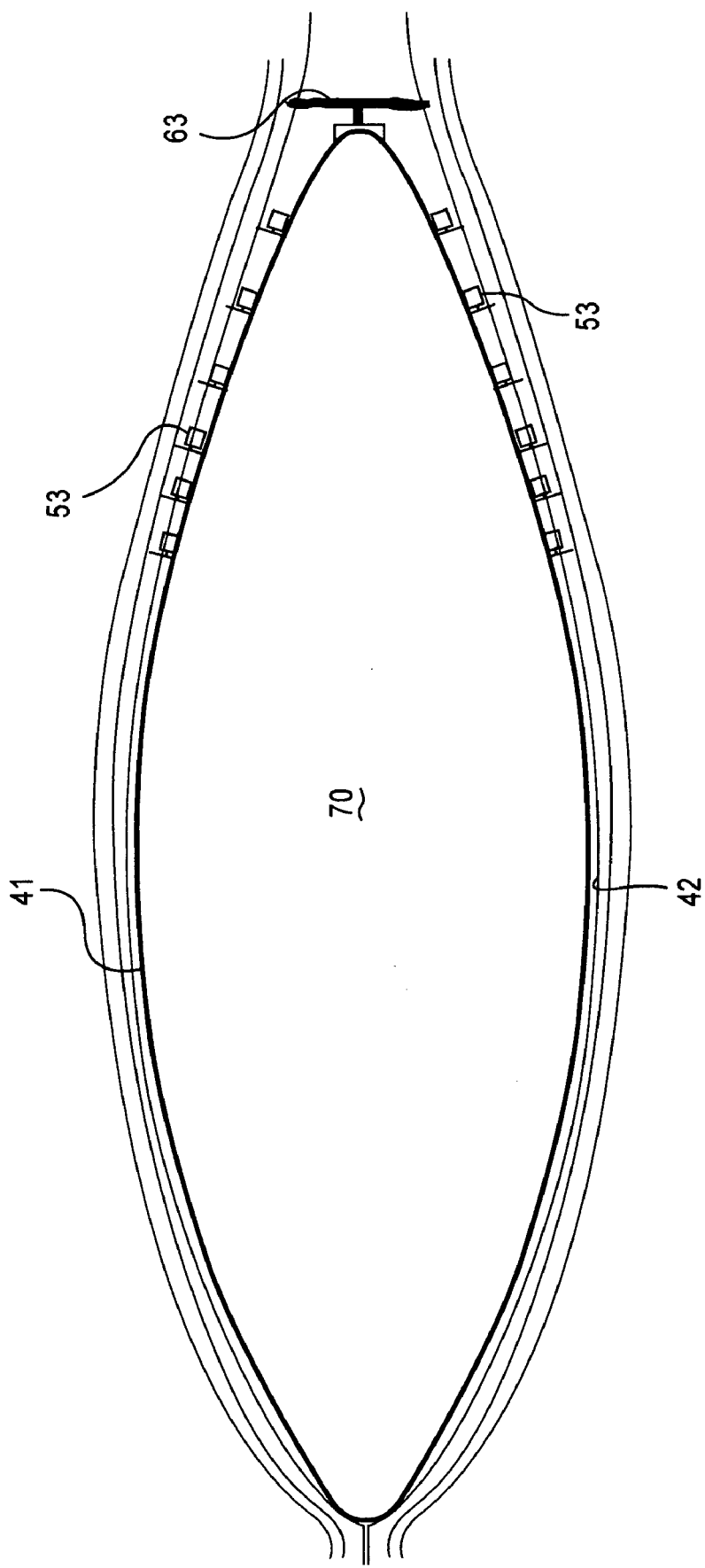

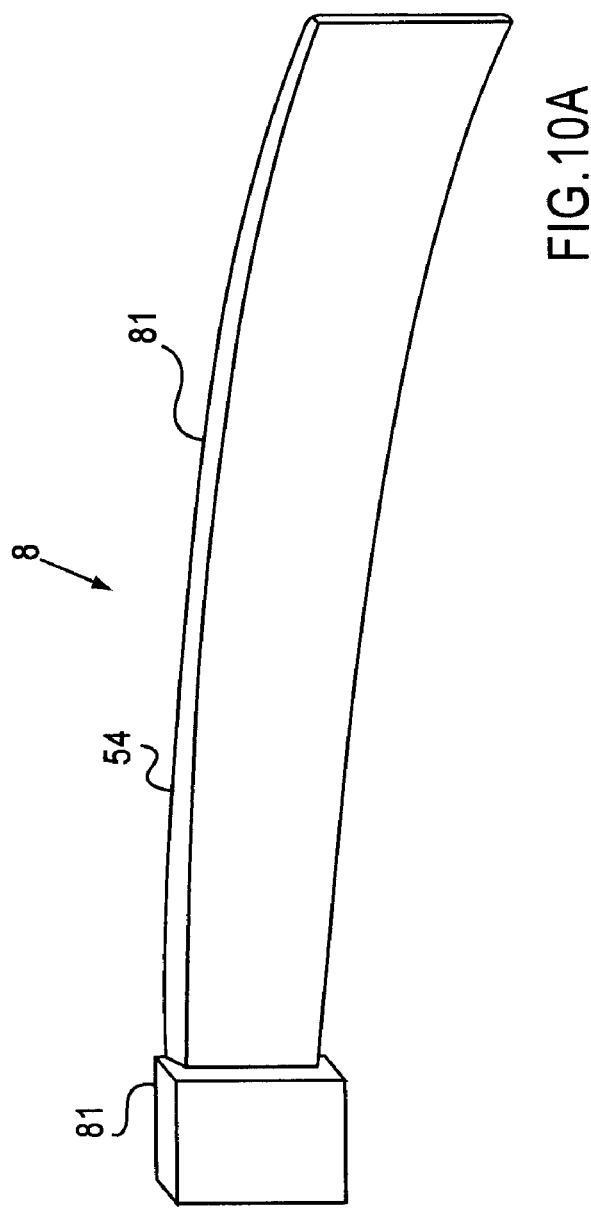
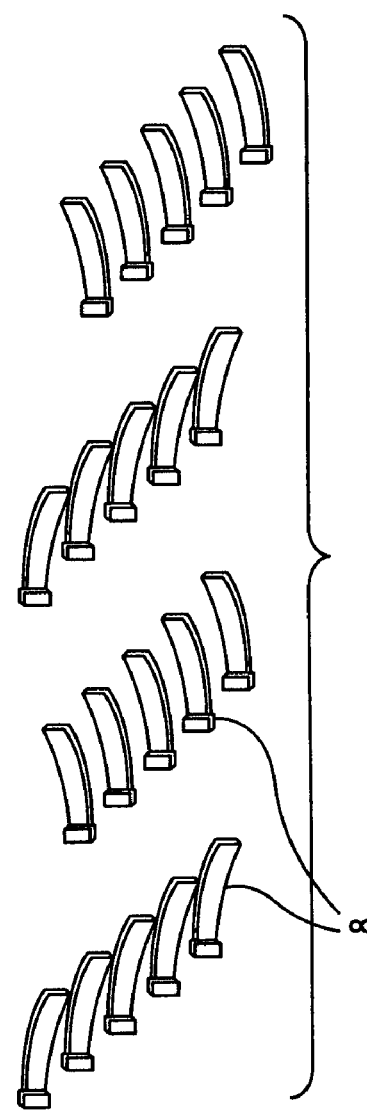
FIG.10A
FIG.10B

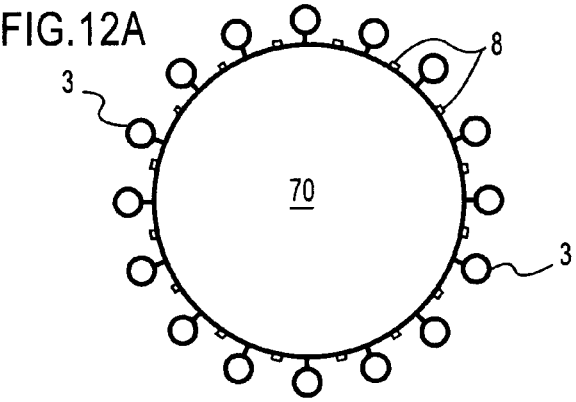

Equal prop speed for straight flight.

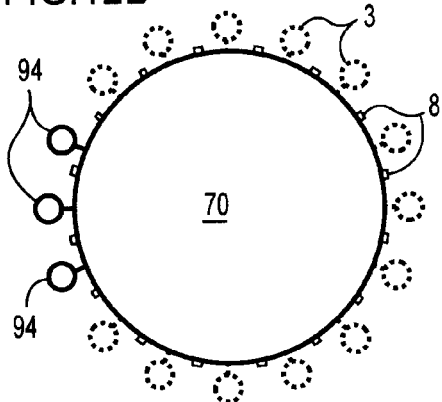

Turn Right. Props on the left side spin faster than the ones indicated in dashed lines

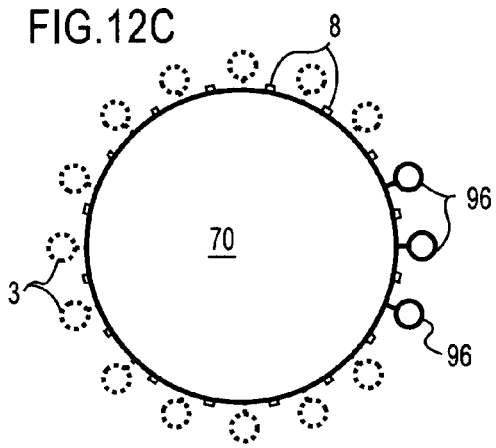

Turn left. Props on the right side spin faster than the ones indicated in dashed lines

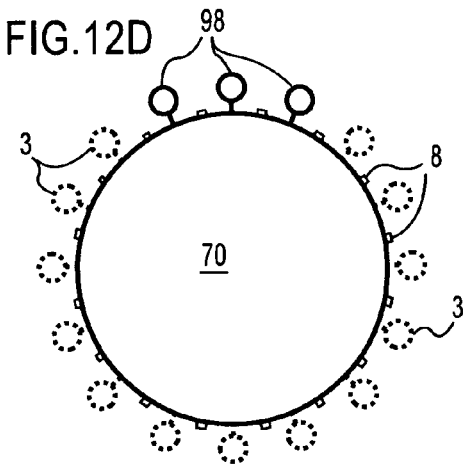

Nose Down. Props on the top spin faster than the ones indicated in dashed lines

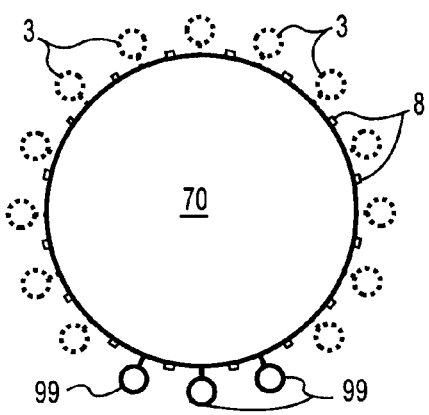

Nose Up. Props on the bottom spin faster than the ones indicated in dashed lines Props pivoted to control left side roll.

Props pivoted to control right side roll.

BOUNDARY LAYER PROPULSION AIRSHIP WITH RELATED SYSTEM AND METHOD

CROSS REFERENCE TO RELATED APPLICATIONS

Not applicable.

STATEMENT REGARDING FEDERALLY SPONSORED RESEARCH OR DEVELOPMENT

Not applicable.

INCORPORATION BY REFERENCE OF MATERIAL SUBMITTED ON COMPACT DISC

Not applicable.

REFERENCE TO A "MICROFICHE APPENDIX"

Not applicable.

BACKGROUND OF THE INVENTION

1. Field of the Invention

The invention pertains to drag reduction in the operation of aircraft and airships by boundary control propulsion and boundary layer control propulsion systems. More particularly, the invention relates to control and flight operation of airship movement using a novel propulsion system having a cluster or array of micro propellers, moveable riblets or a combination of micropropellers and riblets operating within the boundary layer of air around the airship fuselage when in flight. The invention includes a boundary layer propulsion system having micro propellers, riblets or a combination of micro propellers and moveable riblets composed of electroactive polymer (EAP) materials mounted on the airship fuselage in the area of boundary air layer separation to not only reduce drag but also provide maneuvering control over the three flight axis of pitch, yaw and roll of an airship.

2. Description of Related Art Including Information Disclosed Under 37 C.F.R. 1.97 and 1.98.

The basic concept of a propeller can be dated back to the time of Archimedes (287-212 BC), whose work on ship propulsion has earned him the credit for the invention of the screw propeller. Modern propellers still behave in a manner analogous to rotating a screw or auger through a solid, just as is in Archimedes' time. The thin twisted blades of the modern propellers resemble an airfoil far more than they resemble a screw. An airfoil generates lift by producing a pressure imbalance when air moves around a propeller. Rotating propeller airfoils generate pressure imbalance through the relative movement of air over the curvature of the rotating blade surfaces. A helicopter propeller works the same way as that of an aircraft propeller, the only difference being that the helicopter propeller rotates around a nearly vertical axis whereas an aircraft propeller rotates around the longitudinal axis.

Propeller design has been largely based on the theory of optimum propeller as developed by Betz, Prandtl and Glauert. According to theory, when designing a propeller driven aircraft only a few initial parameters need to be specified when consider the propeller and propulsion system which has generally omitted considerations of boundary layer control and flight control of the aircraft using boundary layer modifications. Instead the prior art has focused upon the optimum propeller design as being a function of: 1) the diameter of the propeller, 2) the axial velocity of the flow, 3) the number of blades, 4) the selected distribution of propeller blade lift and drag coefficients along the radius, 5) the desired thrust of the available shaft power, and 6) the density of the fluid medium. Of all these parameters, the diameter of the propeller has been considered in the prior art to the greatest individual impact on the performance of the propeller.

As a result the largest propeller with the most slender blade is considered to be the most efficient, which is the length by the rotational speed of the propeller to prevent the tip of the propeller from exceeding the speed of sound to avoid energy consuming sonic shock formation. A larger propeller captures more incoming fluid or air and distributes its power and thrust on a larger fluid volume, creating a small pressure imbalance, which is compensated by having a larger area for the pressure imbalance. The small pressure imbalance is a direct consequence of the relative axial velocity (the slippage velocity between the blade surface and the air). The lower the relative slippage velocity, the more aerodynamically efficient is the propeller.

Also known in the prior art is the use of variable pitch control of the propeller in larger and more sophisticated aircraft. Variable pitch control of the propeller blade provides rotational control over the longitudinal axis of the propeller at the propeller hub to provide increased lift on takeoff and reduce drag in flight and accommodate variation in the density of air at different flight attitudes. Variable pitch propellers are located in the same locations as ordinary propellers and hence do not involve boundary control propulsion or boundary layer control for modifying the pitch, roll and yaw flight axis of flight. Variable pitch propellers also have not been made of electroactive polymer (EAP) materials to control the length or specific shape of the propeller itself.

In the prior art various propeller design principles promote the use of larger and slimmer propeller blades. It is impractical to place a propeller having large blades near the boundary layer flow near the surface of an aircraft fuselage. The advantage of operating a propeller well inside the boundary layer is that the air flow inside the turbulent boundary layer tends to have much smaller air speed relative to that of the free streaming air around it from the perspective of the aircraft. A physically equivalent view is to view it from the perspective of the standing air where the boundary layer air acquires forward momentum as it travels close to the frame of the aircraft.

Theoretically, a boundary layer propeller can recapture some of the momentum "stolen" by the turbulent boundary layer air that is responsible for the parasitic drag experienced by the aircraft which increases with speed at a given altitude. However, at low altitudes, i.e. below the stratosphere, the boundary layer surrounding the frame of an aircraft is typically very small at the fore of the body, and gradually increasing toward the aft of the body for a fully streamlined body. This gradual thickening of the boundary layer is typically followed by an abrupt fluid separation right after it passes the mid-plane, where a portion of the boundary layer air flow splits off from the body frame with consequent vortex formation and turbulence. Since the boundary layer only begins to rapidly broaden after the aforementioned fluid separation, and since there would have no advantage to operate the propeller within the turbulent wake, a single large propeller quite simply can not take advantage of the additional proportion force carried by the forward-momentum rich boundary layer air.

One area of boundary layer control recognized in the prior art is the use of boundary layer control to improve fuel efficiency of the aircraft. Boundary Layer Control, BLC, is a generic term used to describe various methods used to reduce the skin friction drag by controlling the turbulent transition, the development of full turbulent flows, and the fluid separation. Among those is boundary layer suction, which is currently being used on aircraft wings to prevent laminar and turbulent fluid separation by removing the innermost sublayer of the boundary layer to reduce the boundary layer thickness. One method utilizes a suction pump to such boundary layer air from closely spaced transversal slots. Since both laminar-to-turbulent transition and fluid flow separation require boundary layer of a certain thickness, this method is effective in the laboratory where it was shown that fully laminar flow is possible even for Reynolds numbers far exceeding such transition thresholds. However, the development of a boundary layer suction system is complicated by considerations of optimum slot placement, structural modifications, power systems, and amount of suction needed.

Examples of prior art boundary layer suction systems are described in Stewart, et al. GB 479598A, Thwaites, et al GB 6106222A and Anxionnaz U.S. Pat. No. 3,951,360. There are indications also that very little actual gain in power efficiency is possible as the reduction in skin friction is largely balanced by the large suction needed to maintain the laminar flow.

Another popular method is tangential slot injection. This is exactly the opposite of the suction method in that a high-speed air is injected through a backward pointing slot. One prior art example is Mayer, Jr. U.S. Pat. No. 3,779,199. The sudden nozzle acceleration as a result of the pushing of the high-speed jet on the slower moving boundary layer flow can delay the onset of boundary layer flow separation. Again here the gain in the drag reduction must be weighted against the added power needed for pumping the ducted air to the tangential slots at high-speed. A very similar method is boundary layer blowing, which is primarily used to provide temperature control of high temperature components. Wall cooling has also been proposed for the same purpose and for skin friction reduction by damping the Tollmien-Schlichtling instability to delay the laminar-to-turbulent transition. Here again the amount of cooling power may make such drag force saving impractical.

Yet another popular method is passive surface modification. Examples of such passive surface modification include Mabel GB 881570A which employs a resilient coating, Herbert, et al GB 1019359A which utilizes embossing ridges and Battelle Development Corp. GB 1281899A which utilize a plurality of concave regions. The most popular being the application of flow-aligned miniature ribs, or riblets, to control the growth of small eddies in the near wall boundary structure of the layer.

Both dolphins and sharks have natural riblet-like skins which seem to enhance their ability to swim fast. An average drag reduction of about 6% has been widely reported even though some report as high as an 11% reduction. As there is no additional power required, which is in sharp contrast to the above mentioned suction or jet injected method or skin cooling, riblet-based approaches seem to offer the best chance of providing real-world drag reduction. Riblets are simple to apply too, since companies such as 3M have manufactured riblet films with riblet heights ranging from 20 microns to 100 microns for lower altitude flights. Higher riblets would increase the wetted area significantly, thereby increasing the laminar skin drag. Riblets are also relatively insensitive to an adverse Bernoulli pressure gradient. However, the drawback of using non moveable riblets is that when the flow is no longer aligned with the longitudinal direction of the riblets, the performance of riblets deteriorates rapidly.

Lastly, diffusers have been used in confined air flow as that within a ducted propeller to reduce the drag. The diffuser increases the coupling between the turbulent channel flow with the slower moving (in the frame of reference of the channel wall) boundary layer flow. The diffuser is only useful for channeled flow which is diverging since a diverging channel flow is aerodynamically highly unstable as the air is flowing against the Bernoulli pressure gradient. Diffuser offers no substantial value to external or open fluid flow.

None of the aforementioned methods has yet been proven to be capable of reducing the actual propulsion power in a significant way with the possible exceptions of tangential slot injection and the riblet modified skin. The former is capable of significantly reducing the overall propulsion power requirement even through a large, inefficient internal pump is needed to inject the high-speed air jet because of its ability to postpone the onset of flow separation. A separated boundary layer air flow can create a large stagnant vortex wake that drastically increases the pressure drag in a direct proportion to the cross-sectional area of the wake. Riblets are capable of delaying the onset of turbulent boundary layer flow at the expense of smaller increases in the wetted area, and therefore the Blasius skin drag.

Since the onset of turbulent boundary layer vortices is greatly accelerated by the presence of adverse Bernoulli pressure gradient, and since the working of a propeller can be described by the disk actuation theory (momentum theory), which explains the action in terms of the generation of a pressure discontinuity, it would be possible for propellers working close to the boundary layers (more specifically, to be inside the buffer layer and the viscous sub-layer) to, in effect, reverse the pressure gradient. This is substantially similar to the action of a tangentially injected air jet through a slot in that both can provide a local reversal of adverse pressure gradient. However, tangential slot injection also introduces unwanted additional air into the boundary layer, which offsets much of its benefits.

Fluid flow separation can also be understood in terms of the combined effects of adverse pressure gradients and viscosity. Removal of the adverse pressure gradients can move the separation point further downstream, or eliminate its occurrence altogether. Again this can be accomplished by the introduction of propulsion means within the boundary layer to accelerate the boundary layer fluid, leading to the reattachment of the fluid flow, and thinning the boundary layer in the process.

Some Applications of the above principles to aircraft include Platzer U.S. Pat. No. 5,975,462 which provides for a flapping foil propulsion system for reducing drag. Platzer U.S. Pat. No. 5,975,462 describes many of the boundary layer devices previously discussed and indicates that "the use of small propellers would pose an extremely complicated mechanical installation problem." Other prior art employing a cluster or array of propellers such as Hughey Pub. No. U.S. 2006/0266881 A1 pertains to a vertical takeoff and landing aircraft using a redundant array of propellers. This prior art does not involve boundary layer control BLC for propulsion or control of the various flight axis of pitch, yaw and roll.

Boundary layer control BLC has also been applied to lighter than air aircraft. For example, Whitnah U.S. Pat. No. 3,079,106 utilizes at least one constricted area in the envelope covered by a porous material to provide an air pressure differential across the porous material to reduce drag. Similarly, Sonstegaard U.S. Pat. No. 3,488,019 utilizes a fine shield that allows preferential leakage with a bow and amidships suction and stem blowing and placement of the ballast tanks along streamlines to reduce drag. These boundary layer control devices applied to lighter than air aircraft all use a standard propeller for propelling the airship along with BLC. These prior art airships do not use an array or cluster of micro propellers disposed in the boundary layer. Further such prior art does not employ an array or cluster of micro propellers to control pitch, yaw and roll characteristics of the airship utilizing boundary layer control.

It thus follows that boundary layer propulsion (surface propulsion) can simultaneously provide propulsion force, stabilize the growth of the boundary layer, and suppress or delay the onset of turbulence as well as fluid flow separation. Boundary layer propulsion also steepens the velocity gradient considerably within the near wall, thereby increasing the viscous drag through an increase of the shear stress adjacent to the wall. Boundary layer control can also be used to control the flight path of an aircraft or an airship in the roll pitch and yaw axis of flight more efficiently than conventional control surfaces of aircraft which operate by increasing drag.

SUMMARY OF THE INVENTION

From the foregoing it can be seen that propeller design in the prior art has largely ignored boundary layer separation around the various surfaces of an aircraft or an airship in relation to overall drag reduction on surfaces of the airship or aircraft far removed from the propeller. From the foregoing it is clear that boundary layer separation and propulsion have been ignored in relation to the control of the various flight axis of yaw, pitch and roll in the control of the flight characteristics of an airship or an aircraft.

An object of the invention is to utilize a plurality of small or micro propellers in the boundary separation layer alone or in combination with a conventional propulsion system to reduce drag. As used herein a conventional propulsion system can include one or more conventional propellers, jet engines or other propulsion means disposed outside of the boundary layer. As used herein distributed boundary layer propulsion means utilizing all or a portion of the conventional propulsion means and distributing all or a portion of the conventional propulsion means in the boundary separation area to reduce drag.

Another object of the invention is to utilize a plurality of moveable riblets alone or in combination with the plurality of micropropellers in a boundary separation layer area to reduce drag.

Another object of the invention is to utilize a plurality of stationary riblets alone or in combination with a plurality of micropropellers or moveable riblets in a boundary separation layer area to reduce drag.

Another object of the invention is to construct the plurality of micropropellers and/or riblets from shape memory alloys, piezoelectric materials or an electroactive polymer (EAP) to control the size and configuration of the novel boundary layer propulsion components.

Another objection of the invention is to control EAP boundary layer propulsion components using a computer and pressure sensors disposed in the skin of an aircraft or airship.

Another object of the invention is to control EAP boundary layer propulsion components using a computer and pressure strain sensors embedded in the EAP together with non moveable riblets in an aircraft or airship skin.

Another object of the invention is to utilize a plurality of micro propellers in a boundary separation layer area to control one or more of the flight axis of pitch, roll and yaw to control the flight characteristics of an airship or an aircraft using boundary layer air.

A further object of the invention is to provide a clustered micro-propeller based and/or a plurality of moveable riblets distributed boundary layer propulsion system that is capable of significant weight and stress reduction.

Another object of the invention is to provide a clustered micro-propeller based and/or a plurality of moveable riblets distributed boundary layer propulsion system that can drastically cut down on the noise and vibration generation.

Another object of the invention is to provide a clustered micro-propeller based and/or a plurality of moveable riblets distributed boundary layer propulsion system that provides a distributed propulsion load which minimizes the need for load supporting elements.

A further object of the invention is to provide a clustered micro-propeller based and/or a plurality of moveable riblets distributed boundary layer propulsion system that is capable of operating inside the boundary layer of an aircraft skin to delay the laminar-to-turbulent transition, thereby reducing the overall drag force.

A still further object of the invention is to postpone the onset of boundary layer flow separation for additional pressure drag reduction.

It is a further object of the invention to provide a system and method for propelling and controlling the flight characteristics of an airship or an aircraft utilizing a plurality of moveable riblets and/or cluster of small fast spinning propellers to provide improved efficiency, reduced weight, reduced attendant structural support for the propulsion system, lower noise and lower vibration compared with a single large propeller having the same propulsion power.

In one embodiment of the invention the single large propeller and propulsion power system of the prior art is divided into a plurality of micro propellers that also provides greater rotational balance, quicker response to wind shear and other abrupt environmental changes, and better load and stress distribution compared to a conventional design for a propulsion system not associated with boundary layer propulsion. In a preferred embodiment of the invention the plurality of micropropellers are constructed of an electroactive polymer material to change the shape and length of each propeller in response to a computer and sensors that provide boundary flow data.

In another embodiment of the invention the single large propeller is replaced by a plurality of piezoelectric riblets and/or fins or riblets constructed of an EAP disposed in the boundary layer close to the exterior skin of the aircraft or airship. The distribution of the propulsion means of micropropeller and/or riblets collectively referred to as micro propulsion means is designed to facilitate the balancing of the propulsion load and endure greater redundancy against single point failure. These propulsion components are designed to minimize the use of support structure to sustain the mechanical strains created by the propulsion force. The micro propulsion means preferably operates within the slipstream or the boundary layer of the moving aircraft or airship so as to recover a fraction of the momentum lost by the skin of the aircraft or airship. It is also desirable for the individual propulsion means to minimize the slippage velocity of the incoming air stream in order to maximize propulsion efficiency.

The invention further provides for controlling of one or more of the flight control axis of yaw, pitch and roll of an aircraft or airship by the sculpting of the boundary layer fluid flow with the micro propulsion means operating preferably within the buffer layer away from the viscous sub-layer of the boundary layer flow and in the adverse pressure gradient region. The axial propulsion speed of an individual small propeller or riblet in micro-propulsion means, for example, can be controlled so as to nearly cancel out the momentum lost at the inner boundary layer. This ensures that the effect of the adverse pressure gradient is minimized, thereby postponing the onset of the laminar-to-turbulence transition. The lessening of the effect of adverse pressure gradient also discourages flow detachment immediately downstream. The best mode of the invention is the application of the invention to an airship which term as used herein refers to a craft that utilizes a lift gas for buoyancy and includes lighter-than-air craft (LTA) as well as hybrid aircraft which are heavier than air aircraft which utilize a lift gas for only a portion of their lift. In the best mode micropropulsion means is disposed in an area of rapidly decreasing cross section such as for example at the tail end of a conventionally shaped LTA together with a smaller conventional propeller disposed in the aft section of the airship.

The invention is addition to providing a reduction in drag also provides for the vectoring of an airship or aircraft for steering as well as pitch, yaw and roll control by selectively activating one or more of the areas of the micro-propulsion means situated on the skin surfaces in the boundary separation layer of the airship or aircraft. The novel boundary layer propulsion system provides a reduction in weight and power required for operation in reducing drag and the weight and complexity of the flight control system.

BRIEF DESCRIPTION OF THE DRAWINGS

Various other objects, features and attendant advantages of the invention will become further appreciated when considered in conjunction with the accompanying drawing, in which the reference characters designate the same or similar parts throughout the several views, and wherein:

FIG. 9 is a cross sectional view of one distributed boundary layer propulsion means of the invention and its effect on the boundary layer air flow around an airship constructed in accordance with one embodiment of the invention;

FIG. 10A is a perspective view of an alternative embodiment of another distributed boundary layer propulsion means of the invention;

FIG. 10B is a perspective view of a cluster of an alternative distributed boundary layer propulsion means of FIG. 10A according to an alternative embodiment of the invention;

FIG. 12 G is a cross sectional view taken along the line 12-12 of FIG. 11A illustrating a roll to the right utilizing distributed boundary layer propulsion around the roll axis;

DETAILED DESCRIPTION OF THE PREFERRED EMBODIMENTS INCLUDING THE BEST MODE

In the following detailed description of the invention, numerous specific details are set forth in order to provide a through understanding of the invention. However, it will be appreciated by those skilled in the art that the invention may be practiced without utilizing every one of the specific details in a particular application of the invention. In addition, well-known methods, procedures, materials, components and circuitry have not been described in elaborate detail to avoid an unnecessary obscuring of the novel aspects of the invention. The detailed description is presented largely in terms of simplified two dimensional drawings. These simplified drawings in absence of the ability to present a working model are deemed the best way to concisely convey the substance of the invention to those skilled in the art.

Reference herein to "one embodiment" or an "embodiment" means that a particular feature, structure, or characteristics described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of process flow representing one or more embodiments of the invention do not inherently indicate any particular order or impart limitations to the invention.

Figure 1:
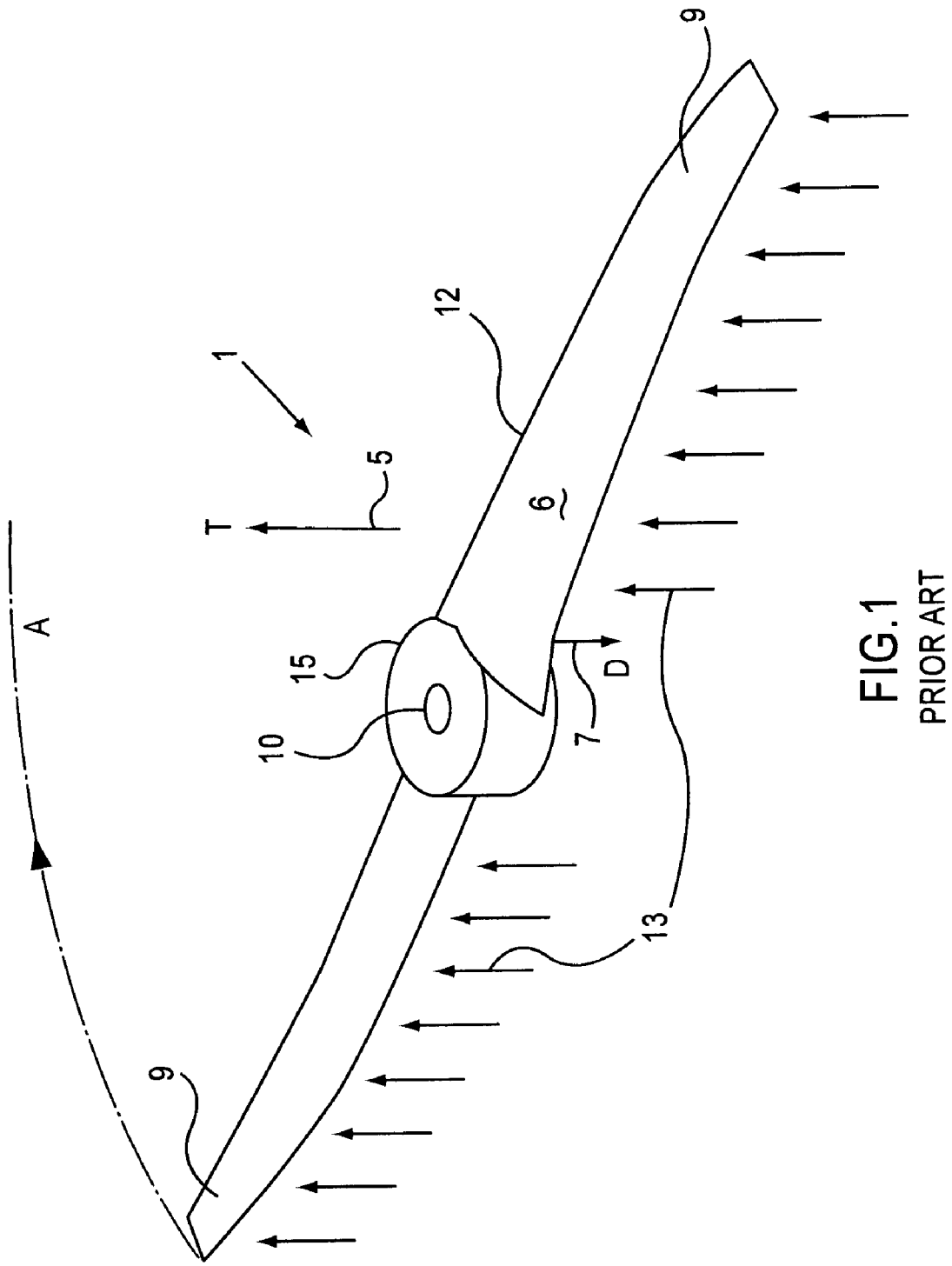
FIG. 1 is a perspective view of the load distribution of a conventional prior art two blade propeller.

Referring now to the drawings, FIG. 1 is a perspective view of a load distribution on a prior art conventional fixed blade propeller 1. The blade body 12 has a curved airfoil surface 6 to produce an aerodynamic force in a manner similar to the wing of an airplane. Consequently the blades 9 are subject to both the main lift force 13 which produces the thrust T represented by arrow 5 in a parallel direction on the axis of the shaft 10 that is attached to the hub 15, as well as the drag D represented by arrow 7 in an opposite direction to the thrust T. There are additional parasitic force that arise from the fact that the flight path of any blade section is helical, which generates a swirl component to its outflow, or wake, and its attendant reaction torque, as well as a centrifugal force. The swirl typically causes a 1% to 5% power loss, more for poorly designed propeller blades. Other forces include Coriolis force that occurs when the shaft axis of the propeller is changing its direction.

The Thrust T as illustrated in FIG. 1, and the efficiency of a propeller can best be understood from momentum considerations. The theory based on such considerations is called the disk actuator theory. According to this theory, for a given thrust, the ideal propeller efficiency improves when the diameter D of the propeller, or more precisely, the disk area A (the area swept by the blade in one complete revolution), increases. The reason is that the smaller the disk loading, which is defined as the thrust divided by the disk area, or T/A, the smaller the additional outflow velocity over the velocity of the incoming flow caused by the propeller. Thus the conventional wisdom for a given propulsion power and the relative speed of the incoming air is always to use the largest possible propeller diameter limited only by mechanical restriction, or by the weight of the propeller as well as propeller tip speed velocity. This explains why human or solar powered aircrafts employ large, slowly turning propellers.

Figure 2A:
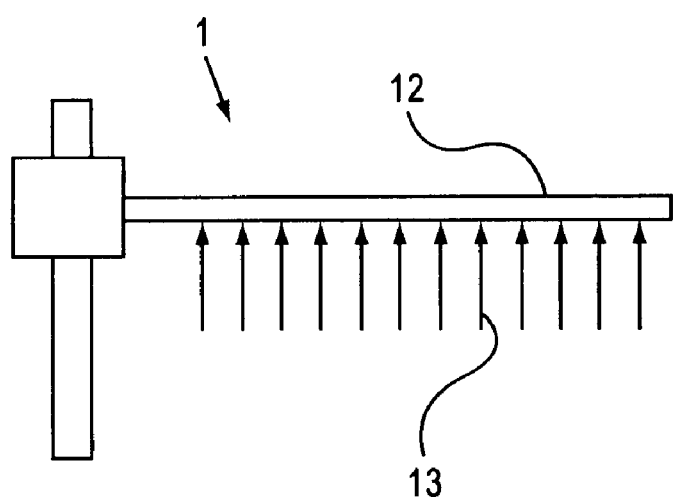
FIGS. 2A and 2B are schematic side views of two prior art propeller blades of identical shape but different sizes.
Figure 2B:
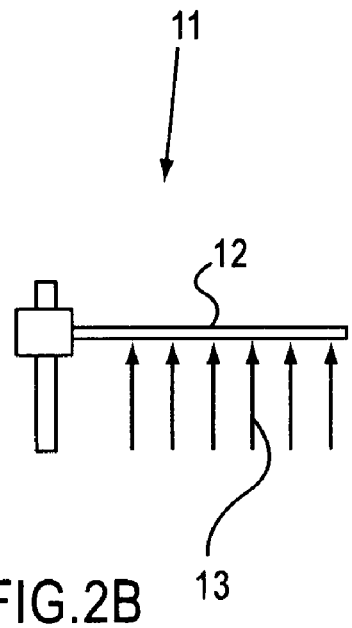

The problem with conventional wisdom is that for a single propeller based system, the disk loading is indeed proportional to $T/D^2$, and hence the larger the diameter D, the more efficient the propeller. The same rationale does not apply to a system with a plurality of propellers. Referring now to prior art FIG. 1, FIG. 3A and FIG. 3B by way of example, consider a system having N identical smaller propellers, each with a thrust of T/N. As long as the total disk area of the sum of plurality of propellers A1, A2 and A3 (FIG. 3B) is equal to A (FIG. 3A) and remains the same, meaning that the diameter D' of the individual propeller is smaller than D by the square root of N, or $D'=D/\sqrt{N}$, then the disk loading for each of the individual propellers in the multi-propeller system is exactly the same as that of the big propeller of the single propeller system since $T/N(D')^2=T/D^2$. Where the efficiency of a propeller is only a function of its disk loading, there is no difference in propulsion efficiency between the single propeller system and the multi-propeller system as long as the total disk area of one system is the same as the other. Thus the distributed propeller system can be just as efficient as that of a single large propeller system where the total weight of the large propeller 1 is distributed among the multi propeller system of propellers 16, 18 and 20. The forgoing analysis can be easily extended to the case where the propellers are of unequal size but identical shape The real mechanical advantage to using a distributed propulsion system comes from the fact that the maximum mechanical strain which is typically concentrated at the root of the blade of the single propulsion system is the same but is distributed among propellers 16, 18 and 20 in the multi-propeller system. This follows directly from the scaling law of the Euler Bernoulli beam equation. Prior art FIGS. 2A and 2B depicts two identically shaped propellers 1 and 11, each of which is subjected to a distributed load 13 with an identical disk loading factor. Although the smaller propeller 11 has a proportionally thinner and narrower blade 12, the total moment load force at the root of the blade 12 is also proportionally smaller. In fact, it can be shown that the force moment is proportional to the length D'/2 of the blade cubed, the rigidity of the blade, which is related to the area moment of inertia of the blade section, is proportional to the fourth power of the blade length, wherein the strain of the blade, which is equal to the second lengthwise derivative of the bending force moment multiplied by the distance from the neutral axis of the blade section, is independent of the blade length. In other words, as long as both propellers have the same disk loading per unit of area, the maximum strain in both of them are theoretically identical. Using the well known stress-strain relationship, it follows that as long as the same blade material is used, both the single propeller system and the multi-propeller system can provide the same safety factor for identical thrusts. It can thus be said that both systems are mechanically equal. However, in practice the small multi-propeller system in comparison weighs a lot less that that of the single large propeller system.

Returning to the example of a system of N identical propellers, the total volume of all N propellers is proportional to the diameter D' of the propeller cubed, multiplied by N, or $D^3/N^{1/2}$. This means, for example, if one replaces a single propeller with 100 identical small propellers that can provide the same net thrust; a factor-of-10 reduction in weight can be realized.

The weight advantage of the multi-propeller system naturally has to be weighed against the added complexity and cost of assembling a multitude of small propellers. Considering the fact though that the tooling costs of making small propellers and the economy of scale of producing the same may far outweigh the additional cost of installing a large number of small propellers over that of a single large propeller. A further advantage of the multi-propeller system accrues from the fact that the aerodynamic load is by nature of a distributed characteristic, whence the weights of the support structures can be profitably minimized if the load distribution of the multitude of propellers can be made to match that of the aerodynamic forces.

Figure 3A:
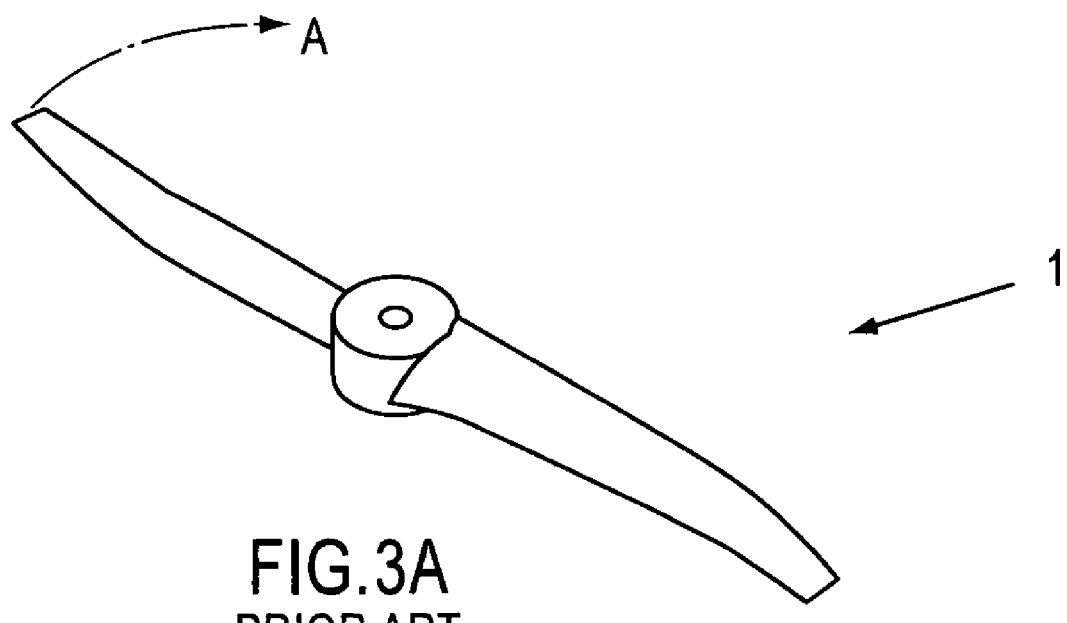
FIGS. 3A and 3B are perspective views of two prior art propulsion arrangements having different numbers of propellers with identical net thrusts.
Figure 3B:
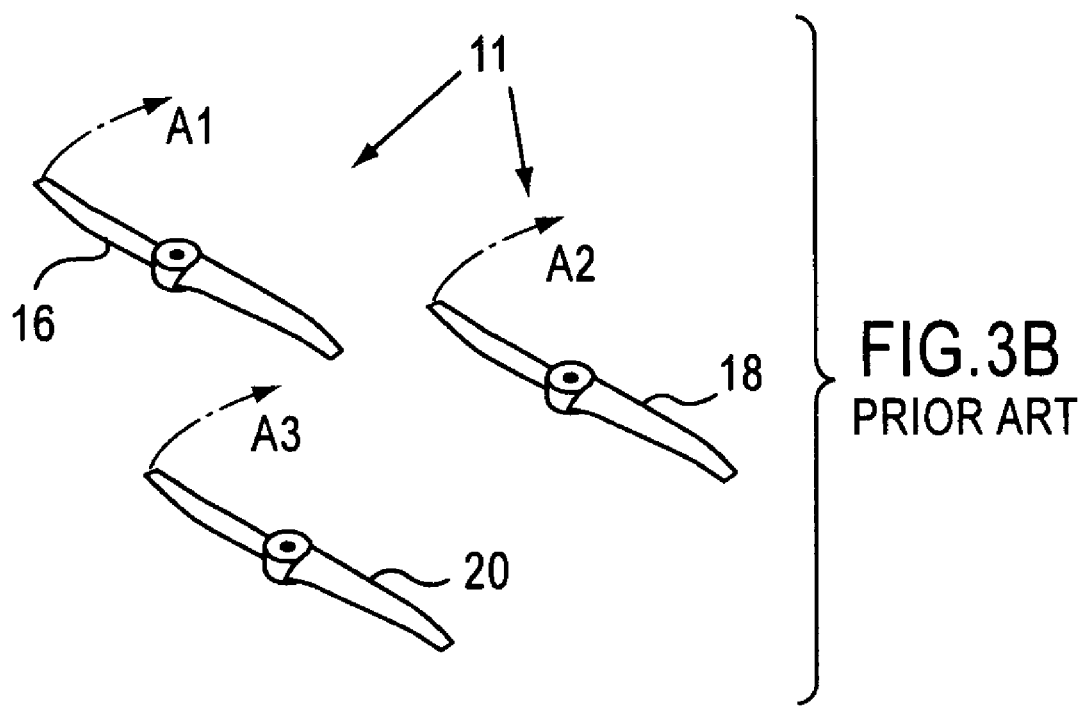
Figure 4A:
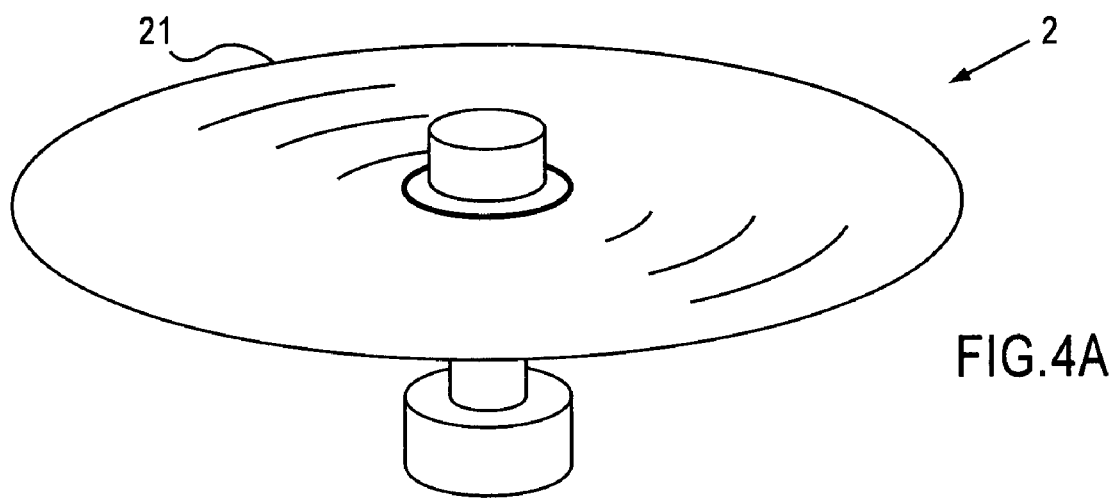
FIG. 4A is a perspective view of an operating single small or micro propeller.
Figure 4B:
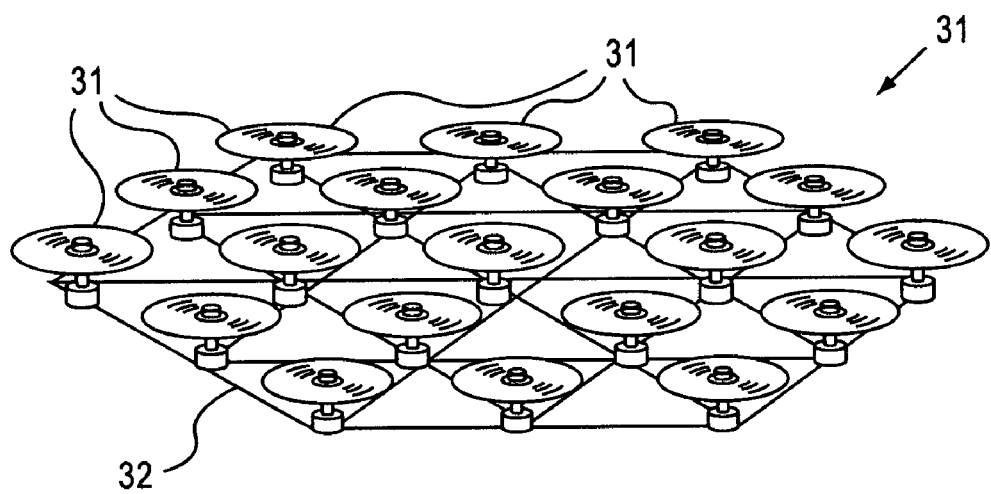
FIG. 4B is a perspective top plan view of a distributed operating micro propeller cluster system according to the invention.

A perspective view of two propulsion arrangements having different numbers of prior art propellers 1 and 11 with identical net thrusts is illustrated in FIGS. 3A and 3B. FIG. 4A is a perspective view of a single propeller system 2 and FIG. 4B is a perspective view of a novel propeller cluster system 3 constructed in accordance with the invention, wherein the single propeller system 2 has the same disk area 21 as the sum of each of the disk areas 31 of the novel multi-propeller system 3. FIG. 4 also illustrates a cabling system 32 that is employed to provide mechanical support structure for the plurality of propellers in the multi-propeller system 3 in an exemplary embodiment of the invention, in which the relative advantage of a distributed load of the multi-propeller system 3 is evident.

Another added benefit of the distributed system 3 stems from its ease to have equal numbers of co-rotating and counter-rotating propellers to balance out the torque force between adjacent pairs of propellers as well as to minimize the loss of propulsion power due to aforementioned swirl. In a co-rotating multi-propeller system, the swirl components from the individual propellers merge to form a single large swirl further down wake, whereas in the counter-rotating multi-propeller system, the individual swirls inhibit and cancel one another and no large scale swirl component or wake is formed.

A multi-propeller system conceptually similar to that depicted in FIG. 4B can further be employed to generate vectored thrust to control the flight path of an aircraft about its pitch, roll and yaw axis. One exemplary embodiment of a vectored thrust generator is to utilize reversible propellers and to have half of the propellers generating positive thrust and the other half generating lower positive or even negative thrust through reverse spinning of the propeller shafts.

The resultant thrust vector determines the direction of the flight as well as to provide pitch, roll and yaw control. It is therefore possible to utilize the principles of the invention to design a helicopter based without the need of a complex mechanical linkage to vary the pitch of rotor blades for directional control. Such a system could eliminate the yaw propeller on a helicopter and its attendant control mechanism to reduce weight, cost, and improve reliability. The propulsion efficiency and safety can be additionally improved by employing a plurality of individually shrouded propellers with the shrouds as safety protection elements as well as aerodynamic and structural elements. A shrouded multi-propeller system can form the basis for a light-weight, compact and highly maneuverable personal aircraft vehicle that could be parked in an ordinary car garage.

The novel distributed propulsion system in the best mode of the invention is employed to provide distributed boundary layer flow control for propulsion. Distributed boundary layer flow control propulsion is generally of minor significance in airplanes that travel at speeds of over 200 miles/hour and is less that 10 m in length. For such aircrafts, the boundary layer thickness is in the millimeter to low centimeter range, and as such would require each individual propeller in the array to have a diameter of a centimeter of less, making boundary layer flow control with propellers impractical.

On the other hand airships, hybrid airships and in particular high altitude airships tend to be well over 100 m in length and typically do not travel at over 100 m/s. For such airships, the boundary layer thickness can be as high as 30 cm or more, making a boundary layer propulsion system particularly advantageous.

Figure 5:
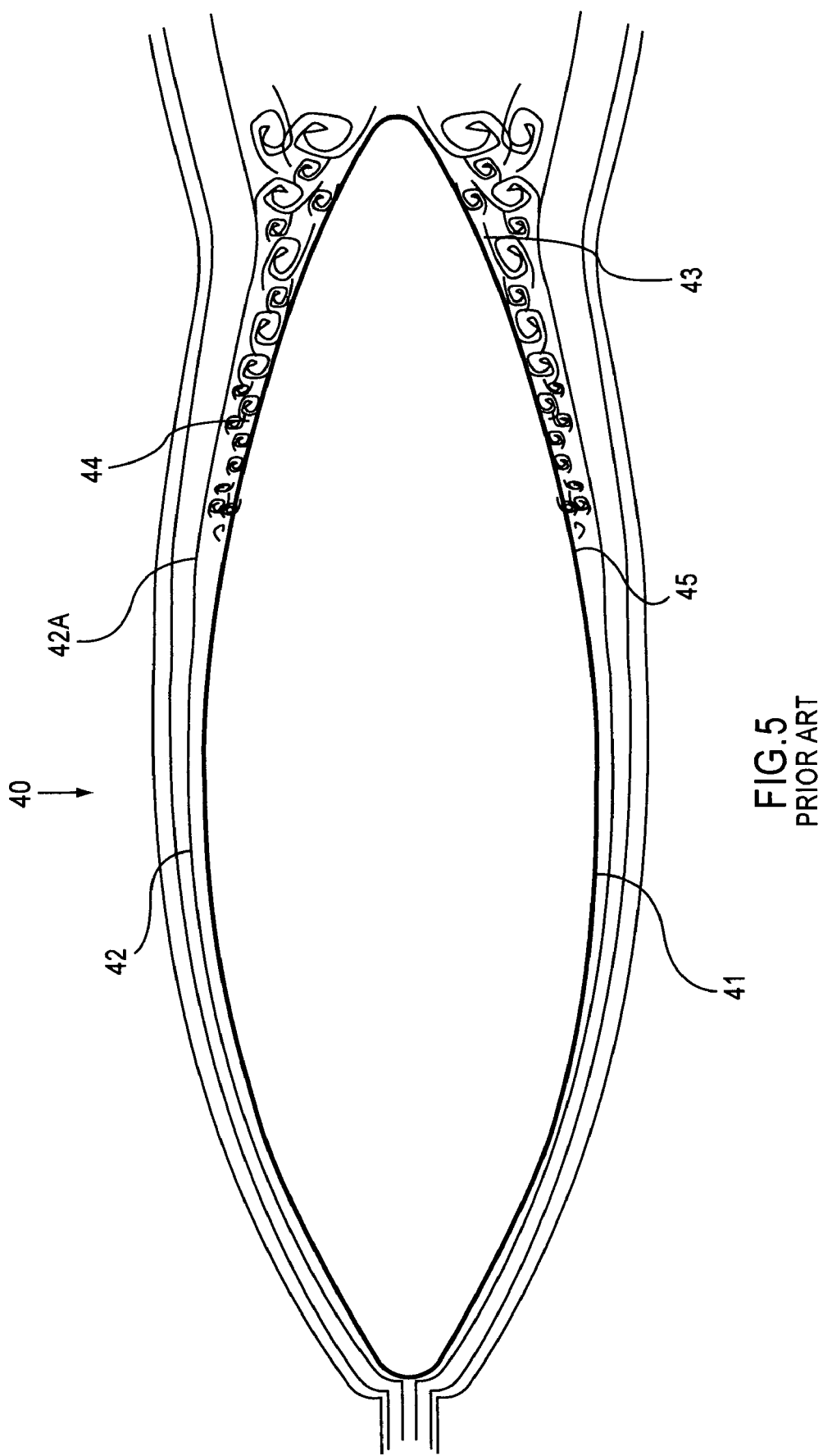
FIG. 5 is a cross sectional view of the boundary layer air flow around a prior art streamlined body representing an airship which includes a view of the detached flows and the turbulent wake.
Figure 6:
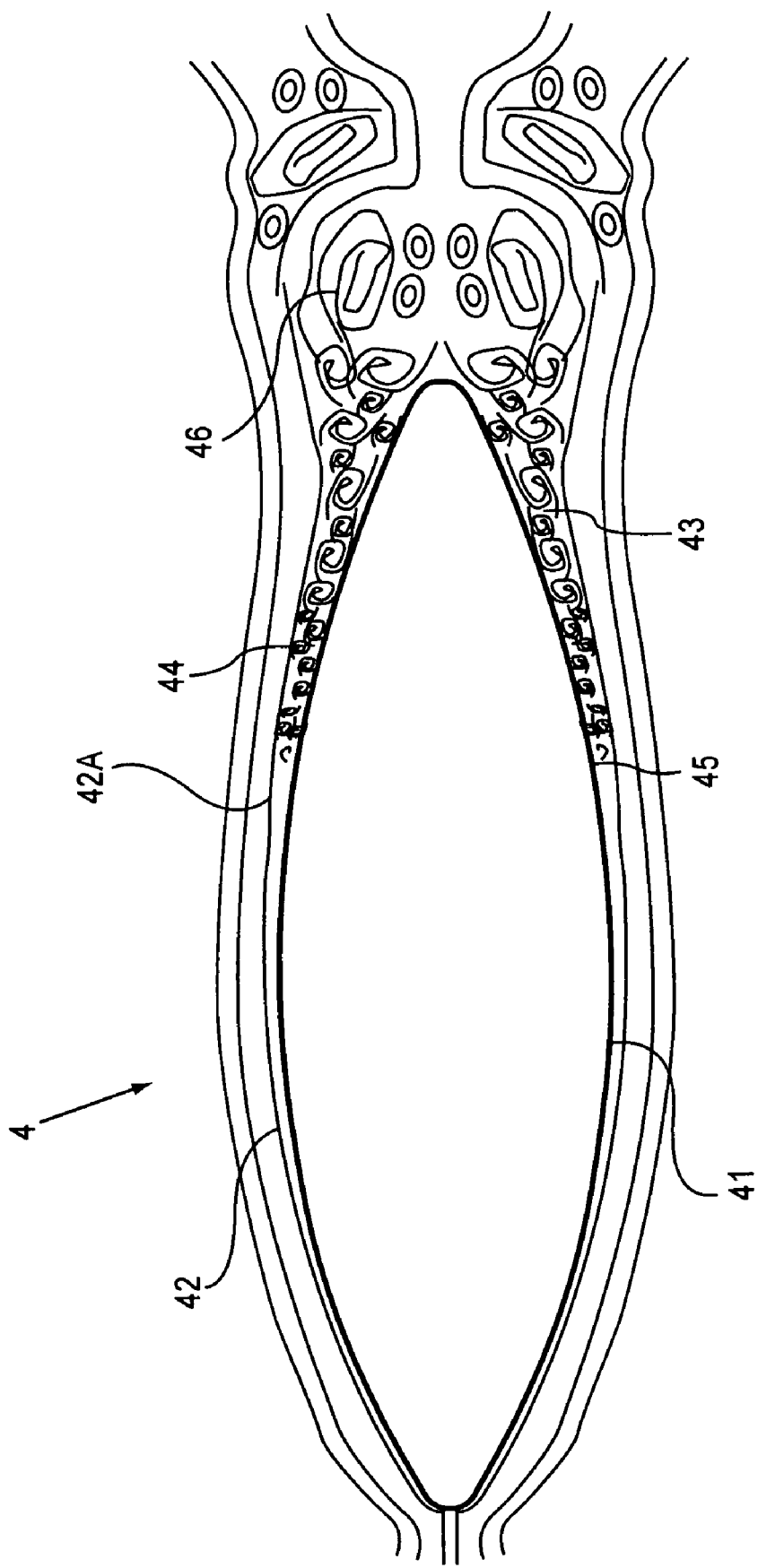
FIG. 6 is a cross sectional view of a prior art boundary layer air flow around a streamlined body of a more fuseform shape such as a prior art airship showing the outward displacements of the boundary layer owing to the presence of turbulent vortices as well as the flow separation.

FIGS. 5 and 6 are prior art side views of the boundary layer flow 42 around an airship 40 and its body 41 as well as a stratospheric airship 4 (FIG. 6). The detached air flow 43 and the turbulent wake 46 (FIG. 6) resulting in drag are shown. Also shown are the onset 45 of the turbulent boundary layer flow and the turbulent boundary layer flow 44 itself all of which contribute to drag on the airships 4 and 40. The boundary layer thickness normally increases monotonically as a distance from the foremost portion of the airship along its body 41. At the nose the boundary layer thickness is negligible. As long as the airship body is sufficiently smooth and devoid of a strong temperature gradient, the boundary layer flow 42 is typically laminar in the favorable pressure gradient region of the fore section of the airship where the cross-section is rapidly expanding. The boundary layer thickness thickens slowly and usually does not exceed a few centimeters before the onset 45 of boundary layer turbulence. However, in the neutral and adverse pressure region along the body, the growth of the boundary layer quickens and inevitably becomes less stable and ultimately develops into an unstable flow pattern, marking the onset of turbulent flow 44. The process in known as boundary layer transition. The transition can occur in the neutral region as well as the adverse pressure gradient region as the pressure begins to recover over the aft section of the body. Boundary layer thickens rapidly after the transition and normally separates from body near the tail region.

The effect of the boundary layer on the drag can be seen as follows, first, the boundary layer adds to the thickness of the body in the form of displacement thickness, which increases the pressure drag, and the shear stress at the surface of the airship body 41 creates skin friction drag. The pressure drag is further enhanced by the lack of closure of the boundary layer, especially after the detachment of the flow, which prevents the surface pressure to fully recover. Clearly, it is highly desirable to postpone or eliminate the transition to turbulence in order to minimize the pressure drag which is typically at least an order of magnitude larger than the skin friction drag. At low Reynolds numbers, which would correspond to an air speed of well under 1 m/s, it is relatively easy to maintain laminar flow. However, at normal air speed, laminar flow can only be dealt with through various prior art boundary layer modification techniques as heretofore discussed such as boundary layer suction, boundary layer blowing or changing the shape of the skin of the airship. The majority of such techniques are impractical owing to mechanical complexities and increased weight.

A laminar boundary layer also has a stronger tendency to separate from the body in the strongly adverse pressure region because of the lack of sufficient forward momentum of the laminar boundary layer flow hinders its ability to overcome the negative gradient. Such a separation results in a drastic increase in the pressure drag owing to the large jump in the effective boundary layer thickness as well as the flattening of the pressure recovery. In order to delay flow detachment, it is often advantageous to deliberately trip the boundary layer into turbulence even at the expense of increasing the skin friction drag. The richer flow profile of the turbulent boundary layer enables it to resist the adverse pressure gradient much more effectively.

Figure 7:
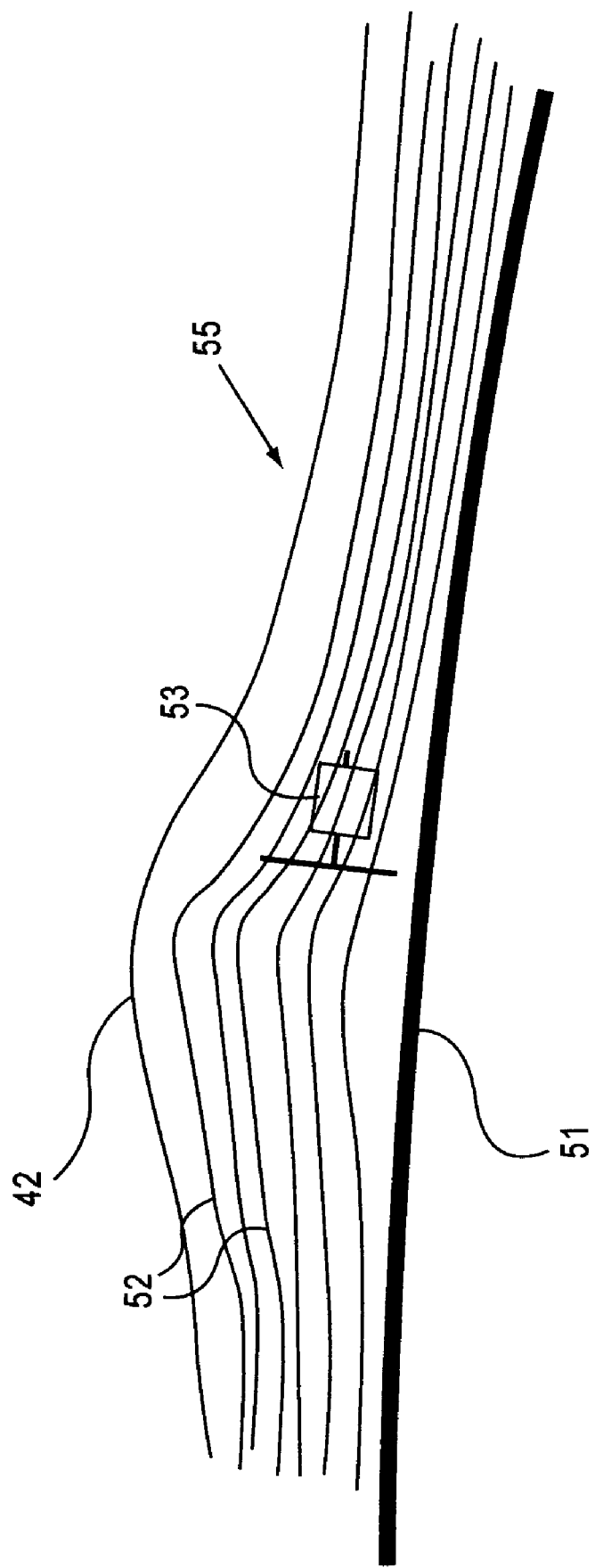
FIG. 7 is a close-up cross sectional view of the boundary layer air flow showing the effect of one embodiment of the novel boundary layer propulsion means in reducing the downstream boundary layer thickness around a surface of an aircraft or skin of an airship.

Boundary layer propulsion provides a more effective way to revitalize and replenish the fatigued boundary layer in the neutral and adverse pressure regions in the mid and aft sections of an airship. FIG. 7 is a close-up side view of the boundary layer air flow 42 around a streamlined body 51 at or near the transition to turbulence area 42A of FIGS. 5 and 6 showing the effect of a modification of a prior art airship by utilizing a boundary layer micro-propulsion means 53 in reducing the thickness of the downstream boundary layer 55. According to the momentum theory, the net effect of the micro-propulsion means 53 is to accelerate the flow in such a way that half of the momentum increment takes place just upstream 52 of the micro-propulsion means 53 and the remaining half occurs in the immediate downstream region 55. A consequence of mass conservation means that any increase in flow velocity (or momentum) leads to a corresponding thinning of the boundary layer, as shown in FIG. 7.

Figure 8:
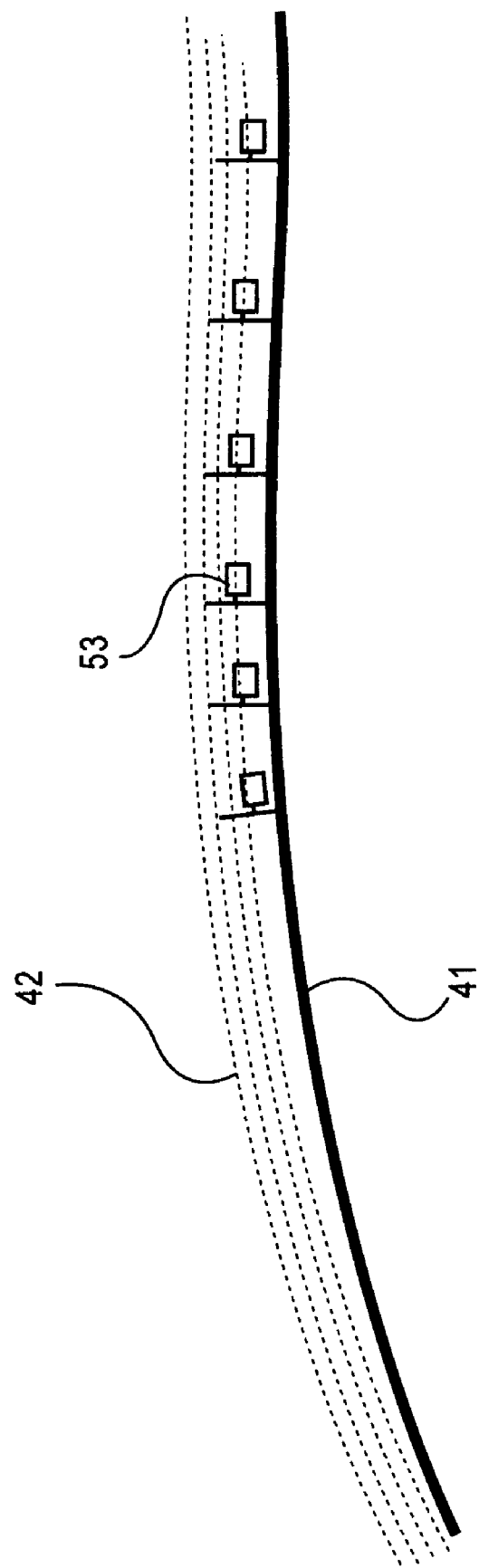
FIG. 8 is a cross sectional view showing the effect of one embodiment of the novel distributed boundary layer micro propulsion system on the boundary layer air flow around a lifting surface of an aircraft or the skin of an airship.

The reenergized boundary layer flow is much better able to handle a strong negative pressure gradient, at least for a short distance. The distance can be approximately determined from the ratio of the gain in the kinetic energy density of the boundary layer flow from the micro-propulsion means 53 to the negative pressure gradient. If the micro-propulsion means 53 are arranged in tandem as illustrated in FIG. 8 such that their separation distances are smaller than the distances computed above, then the boundary layer can be prevented from thickening any further, and since there is always enough downstream momentum (or kinetic energy) of the boundary layer flow to surmount the adverse pressure gradient in the rear section of the airship, as a result the precondition for the occurrence of the flow separation no longer exists. This is depicted in FIG. 8, which illustrates a similar side view showing the effect of a distributed boundary layer propulsion system utilizing a plurality of surface micro-propulsion means 53 on the boundary layer air flow 42 around and along the length a streamlined body 41 in the areas where boundary layer separation would otherwise occur. FIG. 9 is a close-up cutaway view of the distributed boundary layer propulsion system 53 and its effect on the boundary layer air flow 42 around a streamlined body 41. It is seen that a nearly constant boundary layer thickness can be maintained throughout the adverse gradient region in the aft section of the airship. This efficiency in maintaining the constant boundary layer thickness is maintained by the reduced in size prior art propeller 63.

For maximum propulsion efficiency, the micro-propulsion means 53 preferably accelerates the boundary layer flow 42 only just enough to overcome the local adverse pressure gradient for a very short distance. This, however, would require a great number of low power micro-propulsion means 53 to achieve the same net thrust, which is clearly impractical, thus a tradeoff between absolute propulsion efficiency and implementation complexity must be considered. Another trade that is worthy of consideration is the choice between small boundary layer thickness and moderate boundary layer thickness. If a sufficient number of micro-propulsion means 53 are employed, it is possible to reduce the boundary layer thickness so that a laminar flow can be maintained throughout the surface area of the airship body 41. This follows from the fact that at small boundary layer thickness, the velocity gradient of the flow perpendicular to the boundary layer flow 42 becomes so large that the flow is no longer unstable and instead is dominated by shear viscosity, which results in a large increase in the skin friction drag; whereas at large boundary layer thickness, the velocity shear is small, and although the downstream momentum of the flow propelled by the micro-propulsion means 53 is sufficient to counter the negative effect of the adverse pressure gradient, it is not sufficient to prevent the flow itself from being mildly unsteady, the resulting weak eddy nature of the weakly turbulent flow does introduce some local increase in the velocity shear, which also increases the skin friction drag. The most optimum choice of the boundary layer thickness is the one that would lead to a neutral boundary layer flow since it neither contains large perpendicular velocity shear nor introduces localized vortex structures which enhance velocity shear in random directions.

Figure 10C:
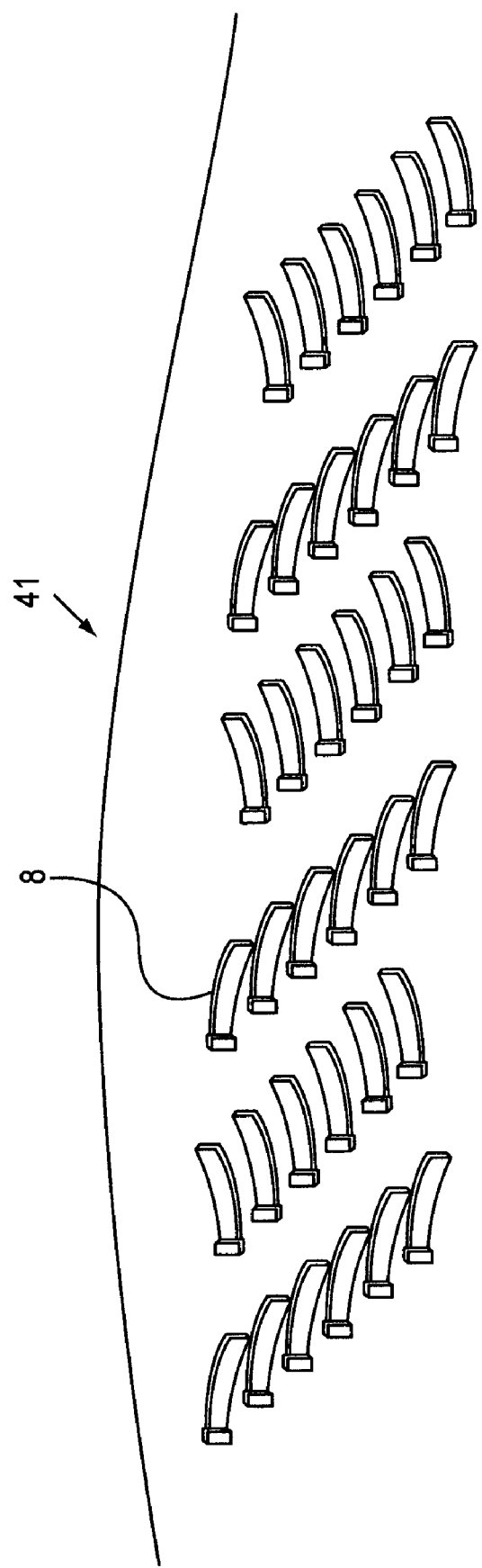
FIG. 10C illustrates the deployment of an alternative distributed boundary layer propulsion means utilizing a propulsion rib cluster of FIG. 10B.

In airships and particularly in high altitude airships, the typical boundary layer thickness in the laminar and mildly turbulent regions are of the order of a fraction of a meter. In high altitude airships it is advantageous to use a plurality of small propellers as the micro-propulsion means 53 to provide a distributed boundary layer propulsion means. However, micro-propellers are not the only choice to provide a distributed boundary propulsion means. An alternative preferred embodiment of the micro-propulsion means 53 is the application of a plurality of micro-, or small, piezoelectric biomorph fins 8 mounted the surface of the airship as depicted in FIGS. 10A and 10B. The first end 81 of each micro-biomorph piezoelectric fin 8 is attached to the airship body 41 FIG. 10C and is in communication with an electric power source of the airship through an electrical harness (similar to the one illustrated in FIG. 13) that passes through the skin of the airship to actuate the piezoelectric fin 8. Upon receiving a sinusoidal driving voltage, the cantilevered portion of the micro-fin 54 is periodically deformed to execute a wave-like motion owing to its bimorph construction. A proper adjustment of the sinusoidal driving frequency of the piezoelectric bimorph fin 8, together with the free end nature of its second end 81, results in a wavy movement of the biomorph fin 8 to become predominantly backward traveling wave which propels a portion of the air backward, accelerating it in the process. By arranging the piezoelectric fins into a two dimensional array as shown in FIGS. 10B and 10C, a distributed propulsion system is provided that is capable of modifying boundary layer flow characteristics. Although the distributed piezoelectric fin propulsion system increases the wetted area which results in a higher skin friction drag, it is more than compensated by the reduction of the turbulent eddies and the elimination of the separated flow.

The micro-piezoelectric biomorph propulsion fins 8 can be further optimized to enhance the propulsion efficiency by more closely matching the speed distribution of the backward traveling wave with the sheared velocity profile of the local boundary layer. Since the velocity profile of the boundary layer varies from zero at the surface of the airship body to the free streaming velocity at the flow boundary, the backward traveling wave must likewise have a wavelength which varies from zero at the surface to its maximum value at the flow boundary. Another consideration is that since the flow velocity must be zero at the surface due to the no-slip condition, there is no point in wasting any extra energy to propel the air close to the surface, hence the amplitude of the backward traveling wave of the fin should ideally increase from zero at the surface to a maximum value at its maximum height. Both these objectives can be realized by varying the thickness of the bimorph layer of the fin as a decreasing function of the height and by attaching the bottom edge of the fin to the body. An added benefit of this embodiment is the potential reduction of the Tollmien-Schlichtling motion similar to the effect that a riblet may have. This can delay the onset of turbulence as well as reducing the strength of the turbulence after the onset.

The piezoelectric biomorph propulsion fin system is particularly advantageously employed in stratospheric airships for the novel distributed boundary layer propulsion means in the thin stratospheric air and where the radius of curvature of the surface of the airship does not result in a boundary layer thickness of about 1 to 10 centimeters. In such applications a piezoelectric biomorph propulsion fin system makes it possible to provide a stratospheric airship with reduced power requirements for station keeping, telecommunications and other applications requiring a high altitude in a substantially geostationary position.

Figure 11A:
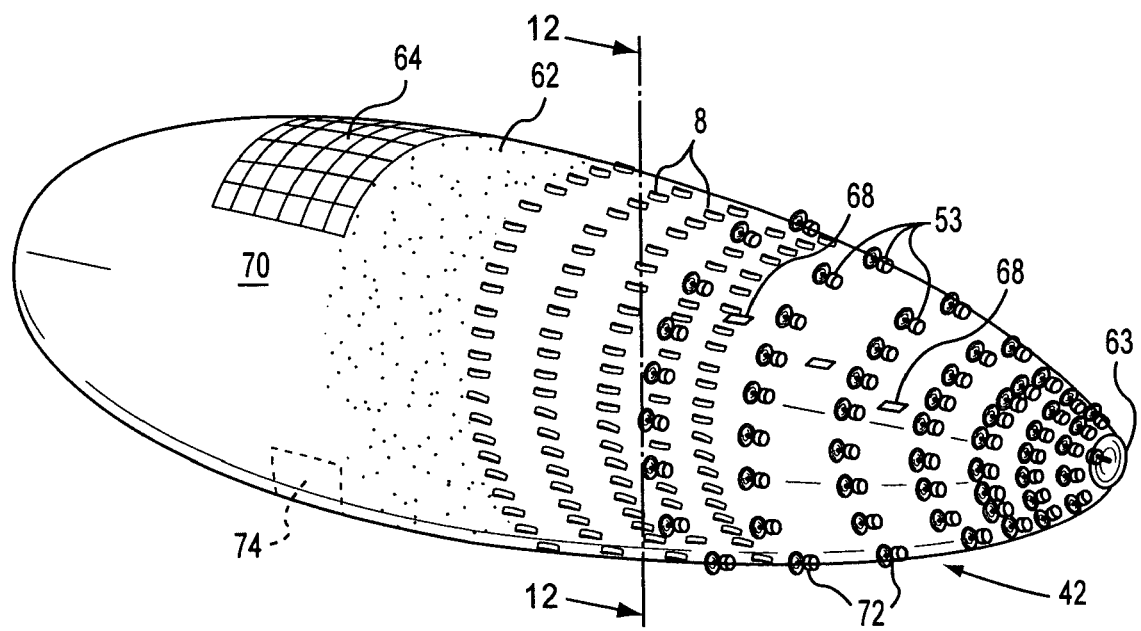
FIG. 11A is a perspective view of one embodiment of a novel airship constructed in accordance with the invention similar to FIG. 9 illustrating a deployment of an array of a propeller cluster system in combination with a stationary riblet skin and moveable riblets providing a distributed boundary layer propulsion means in accordance with the best mode of the invention.

Referring now to FIG. 11A an airship constructed in accordance with the best mode is illustrated. The novel airship 70 includes a passive riblet film 62 disposed on the curved airship skin at or near the beginning of the boundary separation layer. The passive riblet film includes riblets 62 ranging from about 1 micron to 100 microns. The passive riblet film 62 can, depending upon weight consideration, can cover all or part of airship 70 and is particularly advantageously applied to the aft portion of airship 70. A distributed boundary propulsion means in the form of a plurality of piezoelectric biomorph fins 8 or EAP riblets as will be later discussed are disposed on the surface of the novel airship 70 where the boundary separation layer is in the range of about 2 to 10 centimeters high as calculated based on the density of the air, speed of the airship and degree of curvature of the novel airship 70.

In the further aft positions of the airship where the boundary layer thickness approaches about 10 centimeters a second distributed boundary propulsion means in the form of a plurality of micropropellers propulsion means 53 are provided to maintain the flow of the boundary layer as illustrated in FIGS. 8, 9 and 11A. The flow of the boundary air is further assisted by a propeller 63 disposed at the aft end of the novel airship 70.

The speed of each propeller 72 (FIG. 11B) is controlled by a computer 74 to maintain the flow of boundary layer air uniform for straight and level flight as illustrated in FIGS. 8, 9 and 11A as well as the activation and operation of the plurality of piezoelectric biomorph fins. Computer 74 obtains data from a plurality of pressure sensors 68 distributed along the surface of the skin of airship 70. Solar cell panel 64 preferably constructed of flexible solar cells is provided to supply power to the plurality of miniature electric motors 76 for operating the novel distributed boundary layer propulsion system for airship 70.

Figure 11B:
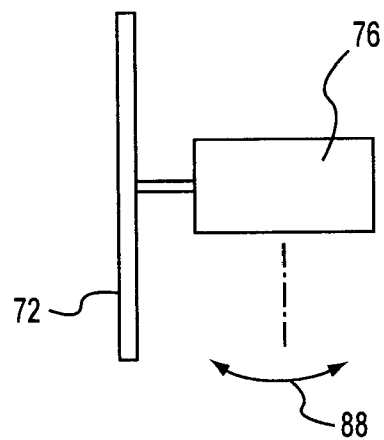
FIG. 11B is a side elevational view of one of the micropropellers similar to FIG. 7 illustrating a rotational axis.

Preferably each of the miniature electric motors 76 are pivotally attached to the skin of the airship 70. Each miniature electric motor has a pivot to pivot as illustrated by arrow 88 (FIG. 11B). The pivot is controlled by computer 74 to provide control over the profile of the boundary layer in the novel distributed boundary layer propulsion system. Computer 74 also controls the speed and direction of rotation of each propeller 72 in the distributed boundary layer propulsion means.

Figure 11C:
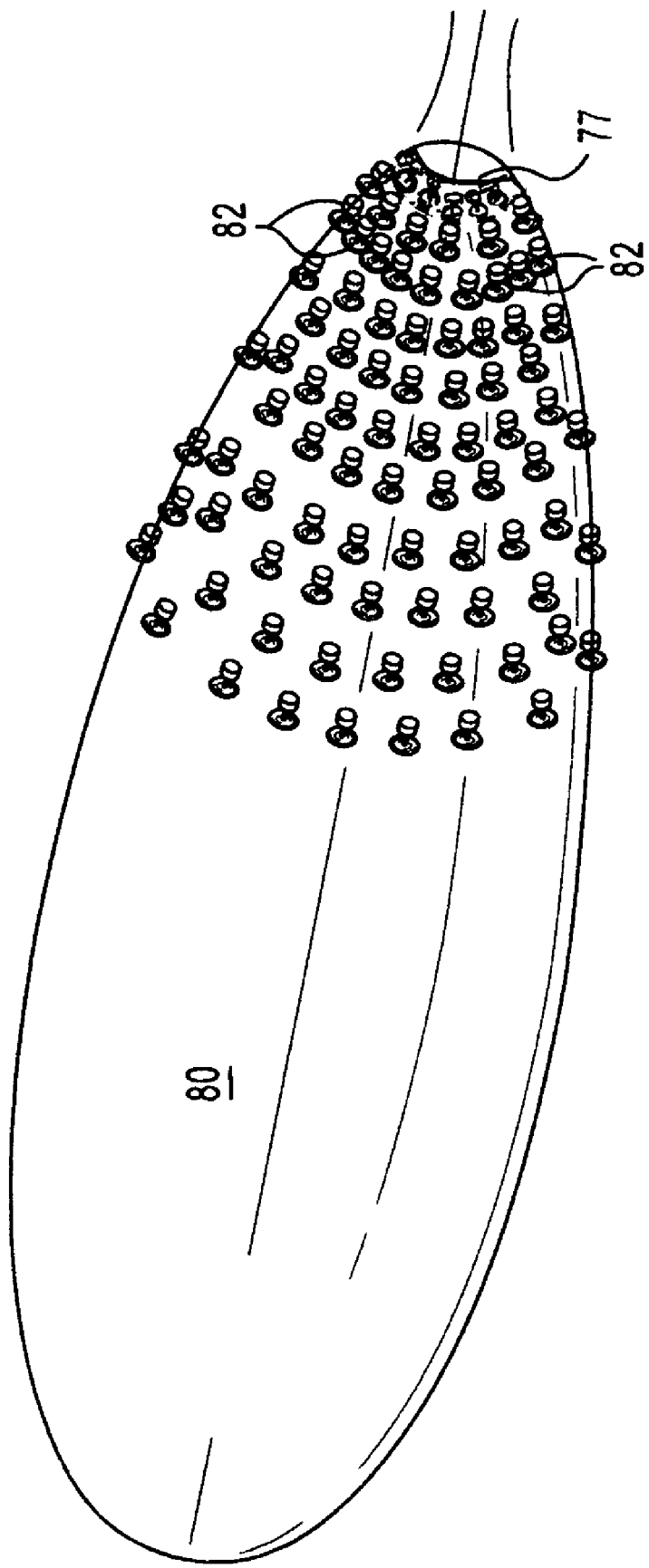
FIG. 11C is a perspective view similar to FIG. 11A illustrating a further embodiment of a novel airship having a distributed boundary layer propulsion means utilizing a propeller cluster system.

An alternative embodiment of the airship 70 is illustrated in FIG. 11C. As previously discussed boundary layer separation and turbulence increases at the rear section of the airship. In the novel airship 70 propeller 63 along with the plurality of the micro-propeller propulsion means 53 are employed to minimize boundary layer separation. In airship 80 in FIG. 11C propeller 63 is removed leaving a blunt end 77 on airship 80.

In airship 80 the last row 82 of the micro-propeller propulsion means 53 maintains boundary layer control of 10 centimeters or less past blunt end 77 to prevent boundary layer separation and the induction of drag past the blunt end 77 of airship 80.

As heretofore discussed the flight of novel airships having a distributed boundary layer control means can be controlled by controlling the speed and direction of rotation of individual propellers 72 in the plurality of the micro-propeller propulsion means 53. For example, as illustrated in FIG. 12A, when all of the plurality of micro propellers 3 are controlled by computer 74 to turn at the same speed and direction straight and level flight is achieved for a symmetrical airship in no wind conditions. Computer 74 is also designed to control airship 70 taking into account wind conditions by varying the speed of the propellers or by having the length, shape and speed of the individual propellers as will be discussed hereinafter in greater detail with respect to electroactive polymers (EAP) and distributed boundary layer propulsion means constructed of Electroactive Polymer Artificial Muscle (EPAM) materials.

Figure 12F:
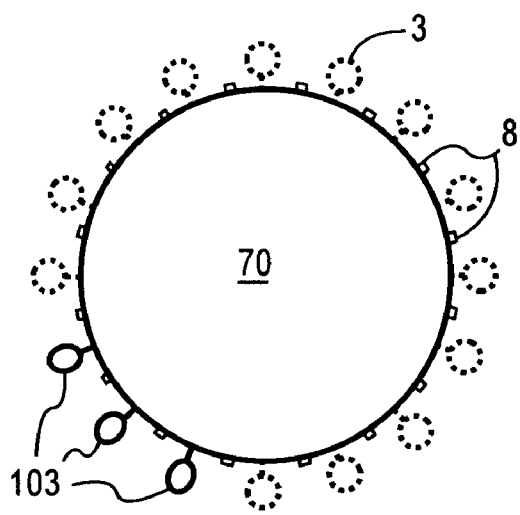
FIG. 12F is a cross sectional view taken along the line 12-12 of FIG. 11A illustrating a roll to the left utilizing distributed boundary layer propulsion around the roll axis.
Figure 12G:
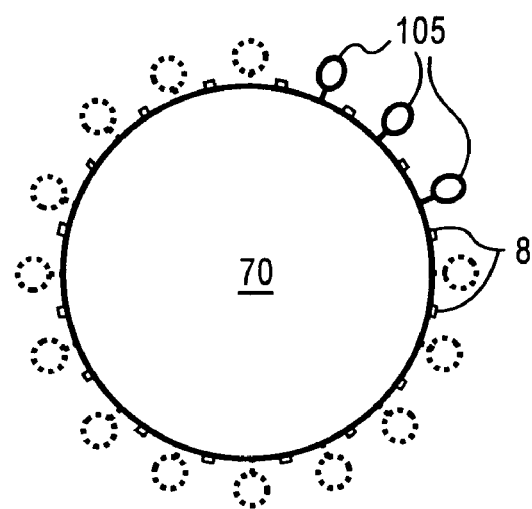
FIG. 12A is a cross sectional view taken along the line 12-12 of FIG. 11A illustrating straight and level flight control utilizing one form of distributed boundary layer propulsion.
FIG. 12B is a cross sectional view taken along the line 12-12 of FIG. 11A illustrating a right turn utilizing distributed boundary layer propulsion around the yaw axis.
FIG. 12C is a cross sectional view taken along the line 12-12 of FIG. 11A illustrating a left turn utilizing distributed boundary layer propulsion around the yaw axis.
FIG. 12D is a cross sectional view taken along the line 12-12 of FIG. 11A illustrating a nose down or descent attitude utilizing distributed boundary layer propulsion around the pitch axis.
FIG. 12 E is a cross sectional view taken along the line 12-12 of FIG. 11A illustrating a nose up or accent attitude utilizing distributed boundary layer propulsion around the pitch axis.

In operation of the novel airship 70 computer 74 can operate micro propellers 94 on the left side of the airship FIG. 12B at a faster rate of speed than propellers 3 or reverse propellers 3 on the right side of the airship to provide a right turn while maintaining boundary control. In a left turn the micro propellers 96 on the right side can be operated by computer to turn faster than the other micro propellers 3 and particularly the propellers 3 on the left side of the airship to provide a left turn as illustrated in FIG. 12C. Computer 74 can also control micro propellers 98 to spin faster than the remaining propellers 3 resulting in a nose down or a descent of airship 70 as indicated in FIG. 12D. Similarly computer 74 can cause micro propellers 99 to turn faster than the remaining micro propellers 3 to provide a nose up or climb configuration for airship 70 while maintaining boundary layer control and distributed boundary layer propulsion as indicated in FIG. 12E. Roll control or control over the roll axis can be controlled by computer 74 by operating propellers 103 faster than the remaining propellers 3 as indicated in FIG. 12F to provide a roll to the left. Similarly a roll to the right can be controlled by computer 74 by operating micro propellers 105 faster than the remaining micro propellers 3 as indicated in FIG. 12G.

Figure 13:
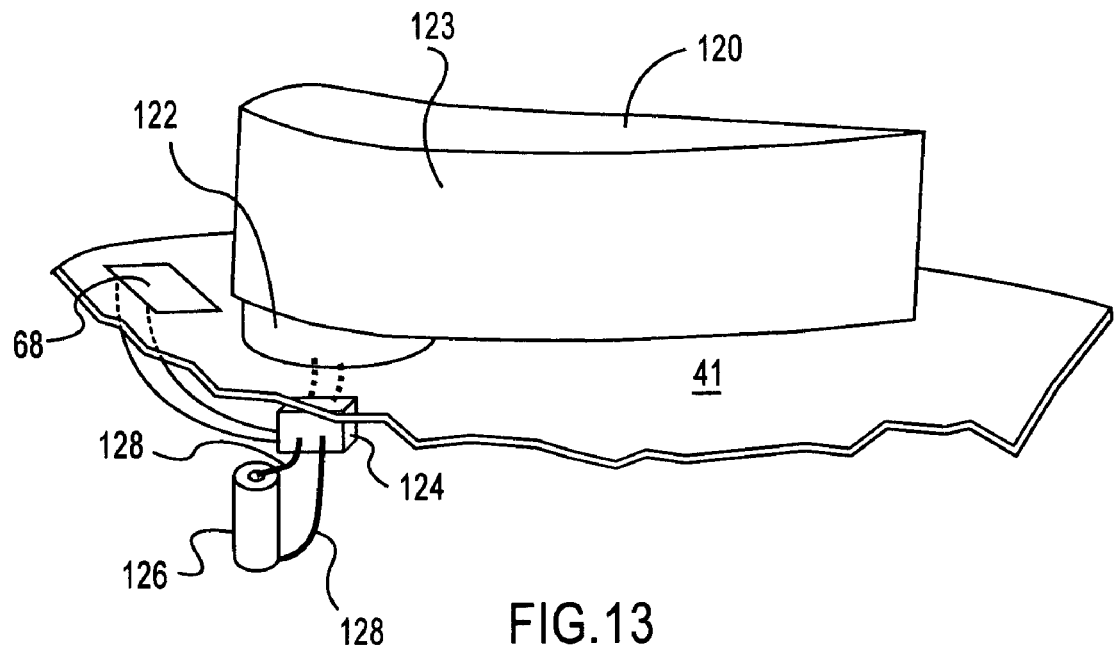
FIG. 13 is a perspective view of a distributed boundary layer propulsion means similar to FIG. 10A constructed of an electroactive polymer (EAP)

The control of the three axis of flight of airship 70 can also be controlled by the computer control of fins 8 in FIG. 11A especially where the fins are composed of an electroactive polymer material (EAP) that can change in shape and length. EAP materials such as elastomer silicones and acrylic elastomers and particularly acrylic elastomers such as VHB4910 which is commercially available form 3M can be used in the construction of EAP fins 120 (FIG. 13) or riblets 130 (FIG. 14) disposed in the boundary layer to provide an additional or alternative distributed boundary layer propulsion means. An EAP fin 120 is illustrated in FIG. 13 having a rigid base 122 and an electroactive polymer body 123 which has the ability to change length and shape upon activation by EAP controller 124. EAP fin 120 is attached to and through airship skin 41 to the EAP controller 124. EAP controller 124 is electrically connected to an EAP power supply and control circuit 126 through leads 128. Each EAP power supply 124 and control circuit 126 is connected to computer 74 (FIG. 11A) to provide for the coordination and operation of each of the EAP fins 120. However due to the electroactive polymer body of EAP fin 120 each EAP fin 120 can change shape and length to provide a greater control over boundary layer air than piezoelectric fins 8. The shape and length of each EAP fin 120 is determined by computer 74 based on boundary layer air flow detected by pressure sensor 68 in the airship skin 41.

In addition to EAP fin 120 an EAP riblet 130 (FIG. 14) and an EAP propeller 200 (FIG. 19) can be formed out of an electroactive polymer material and be controlled by computer 74 to change shape and length in providing the distributed boundary layer propulsion means in controlling novel airships constructed in accordance with the invention. Propeller 200 can also be created from various types of shape memory alloy materials known to those skilled in the art of alloys.

Figure 14:
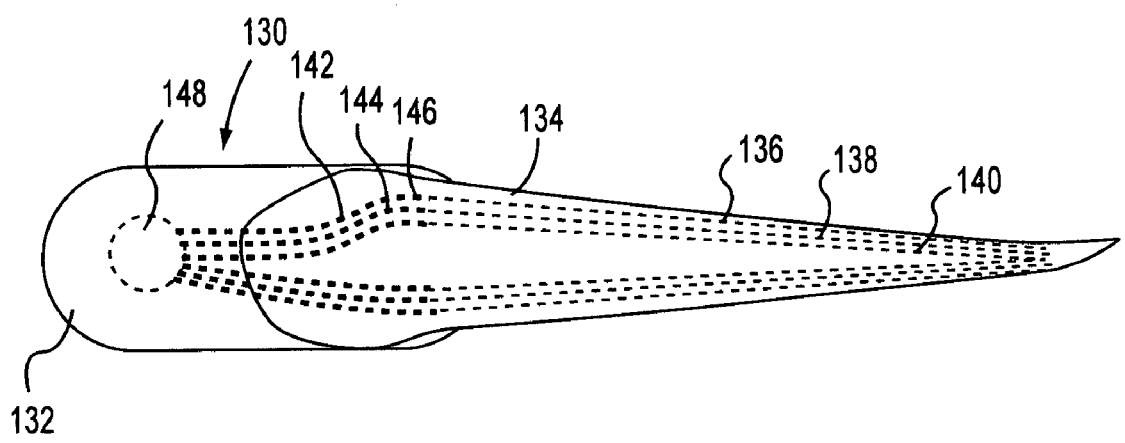
FIG. 14 is a side elevational view of the EAP distributed boundary layer propulsion means consisting of an EAP fin constructed in accordance with the invention.

Referring now to FIG. 14 one of the EAP riblets 130 is illustrated. EAP riblet 130 includes a rigid base 132 connected to and through the aircraft skin to an EAP controller and an EAP power supply and to a computer 74. EAP riblet 130 includes an elastomer substrate 134 and electroactive polymer artificial muscle (EPAM) biomorph layers 136, 138 and 140. The EPAM biomorph layers 136, 138 and 140 provide an elastic conductor EAP sandwich each layer of which is separately activated by electrical leads 142, 144 and 146 to result in the change of the shape and length of EAP riblet 130. An electro mechanical tubular conduit 148 connects EAP riblet to and through the airship skin to an EAP controller and power supply as was previously discussed with respect to EAP fin 120.

Figure 15:
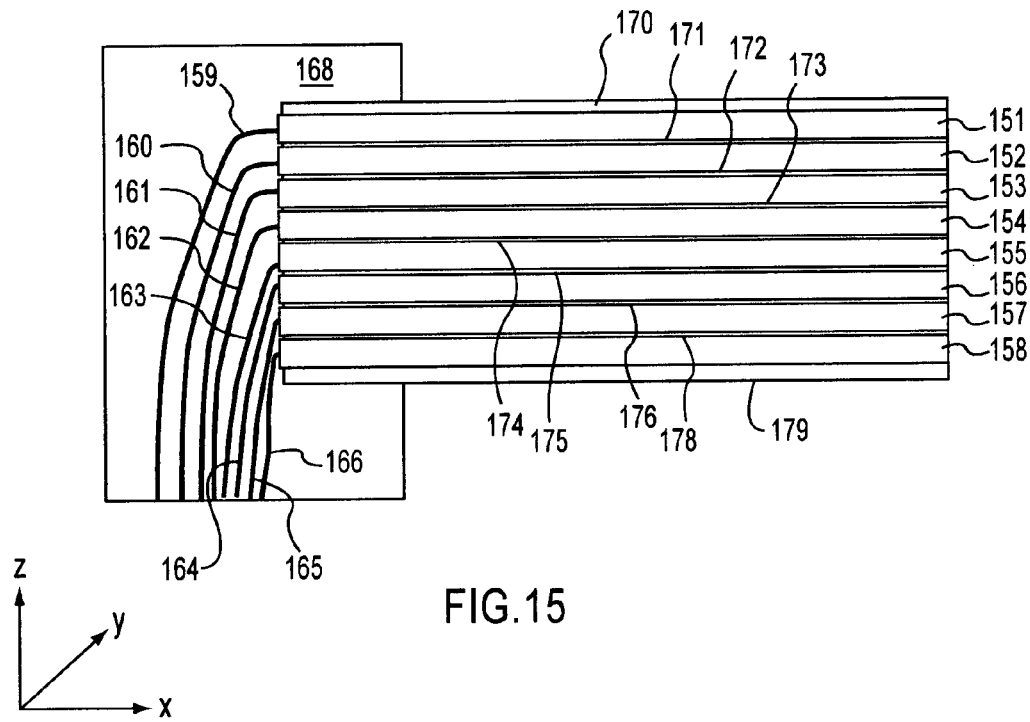
FIG. 15 is a schematic side view of an EAP illustrating the deformations along the XY and Z axis of the EAP utilized in changing the shape configuration and length of riblets and propellers utilized in the distributed boundary layer propulsion means of the invention.
Figure 16:
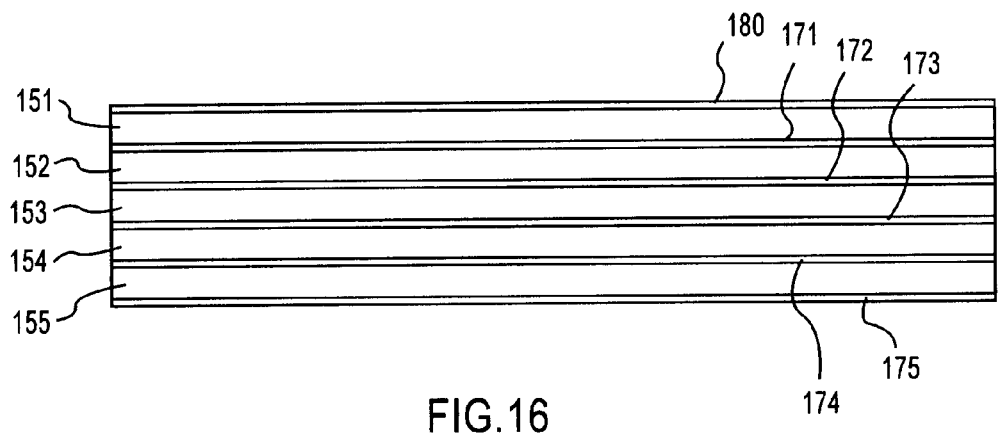
FIG. 16 is a schematic side elevational view of an EAP having a pressure sensing layer incorporated into the EAP distributed boundary layer propulsion means constructed in accordance with one embodiment of the invention.

The ability of EAP materials to change shape and length along the X, Y and Z axis is illustrated in FIGS. 15, 16 and 17. As illustrated in FIG. 15 by employing multiple conducting strips 151, 152, 153, 154, 155, 156, 157 and 158 which are separately controlled by electrical impulses from the corresponding leads 159, 160, 161, 162, 163, 164, 165 and 166 in electrical harness 168 a variable bending of the EAP biomorph layers 170, 171, 172, 173, 174, 175, 176, 178 and 179 is provided. In FIG. 17 only the Z-axis is illustrated. The variation in the X-axis can be equally employed. The X-variation allows a traveling wave to be formed and the variation in the Z-direction allows the amplitude as well as the speed of the backward traveling waveform to vary in the Z-direction to match the boundary layer vector profile. Such actuators are referred to as EAP diaphragm actuators. A diaphragm actuator is made in a planar construction and then is biased in the Z-axis to produce an out of plane motion.

Figure 17A:
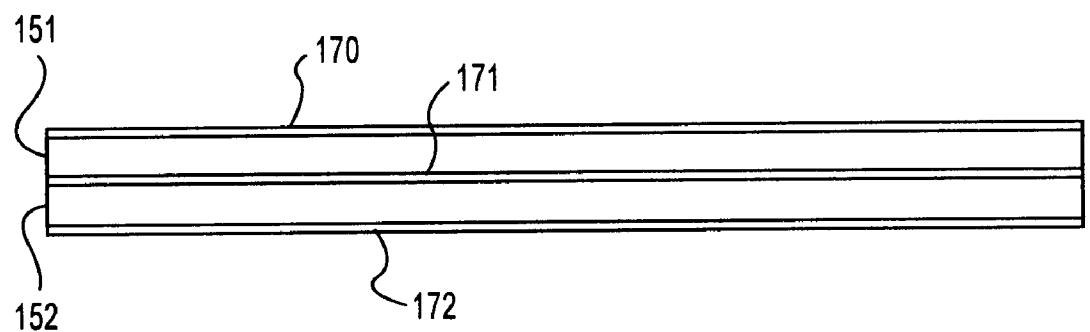
FIGS. 17 A and B are side elevational views of the operation of an electroactive polymer artificial muscle (EPAM) provided by an EAP distributed boundary layer propulsion means constructed in accordance with the invention.
Figure 17B:
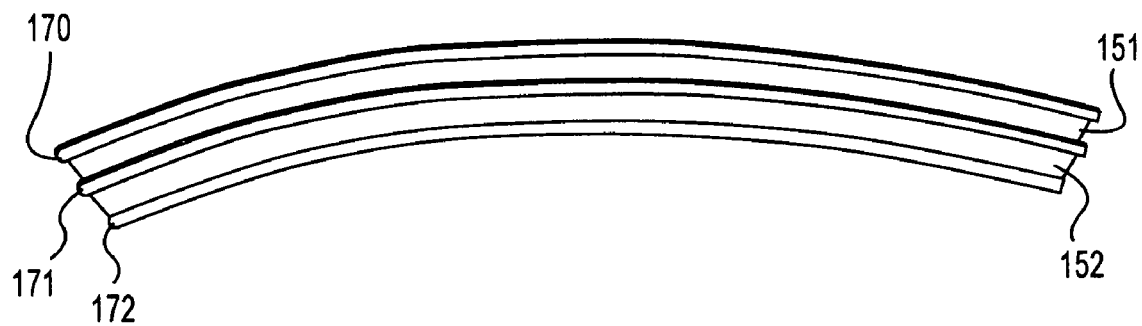
Figure 19:
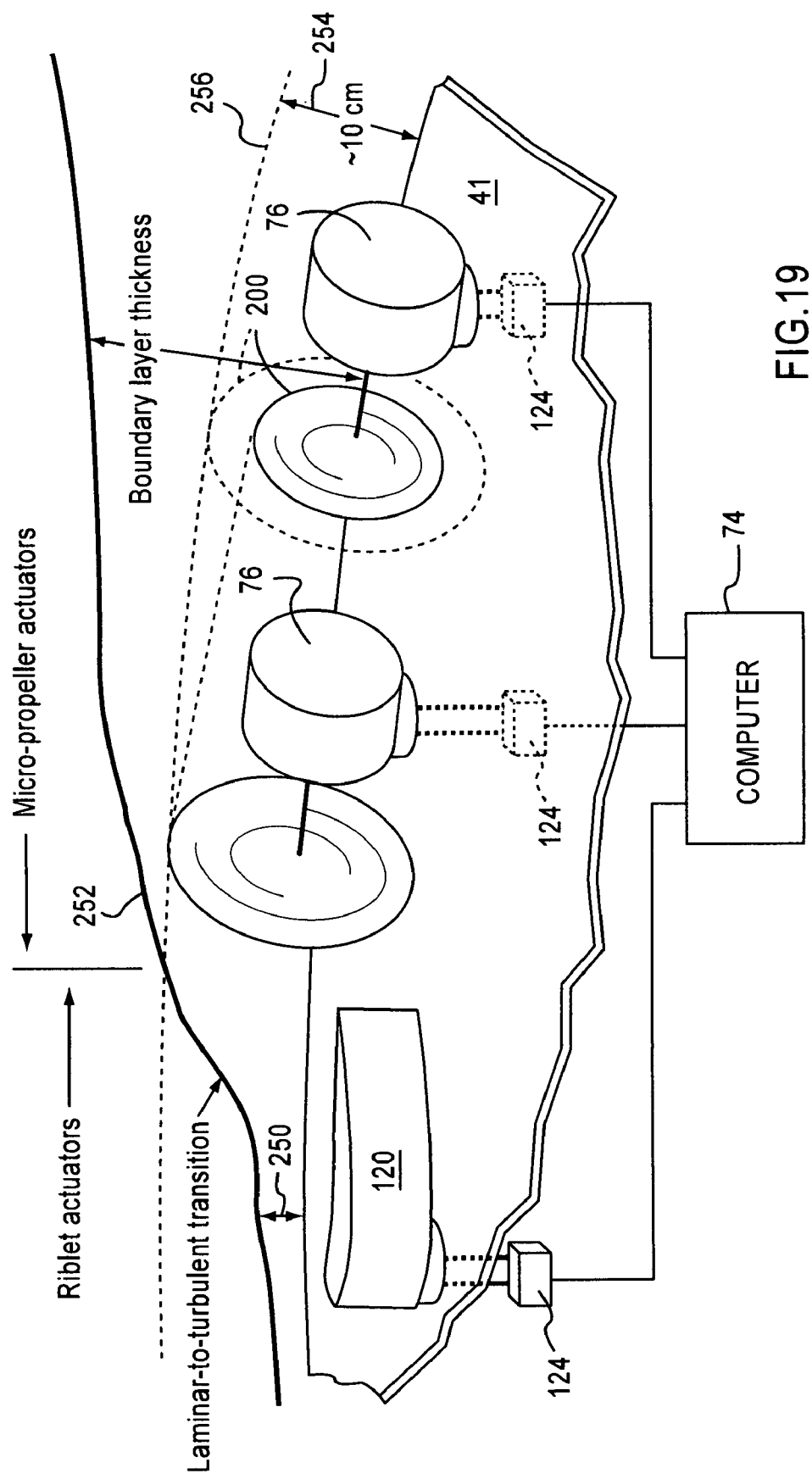
FIG. 19 is a schematic side elevational view illustrating an embodiment for the placement of the novel distributed boundary layer propulsion means in relation to the degree of curvature of the airship skin in relation to the boundary layer thickness.

The separate activation of each layer of the EAP material is illustrated in FIGS. 17A and 17B. The conducting strips 151-158 (FIG. 15) and for example strips 151 and 152 and biomorph layers 170-179 (FIG. 15) and for example biomorph layers 170, 171 and 172 in FIG. 17A provide for the separate expansion of an expansion layer 151 and the contraction of a corresponding contraction layer 152 to provide for the change in shape of a distributed boundary layer propulsion means such as micropropeller 200 (FIG. 19).

The advantages of using EAP materials is further illustrated in FIG. 16. In FIG. 16 the conducting strips 151-155 and biomorph layers 171-175 are employed. However on the outermost layer 180 a pressure/stress sensing layer is provided. Pressure/stress sensing layer 180 eliminates the requirement for a separate sensors 68 in the skin of the airship (FIG. 13). Pressure sensing layer provides for the direct measurement of the flow of boundary layer air from the distributed boundary layer propulsion means.

Figure 18:
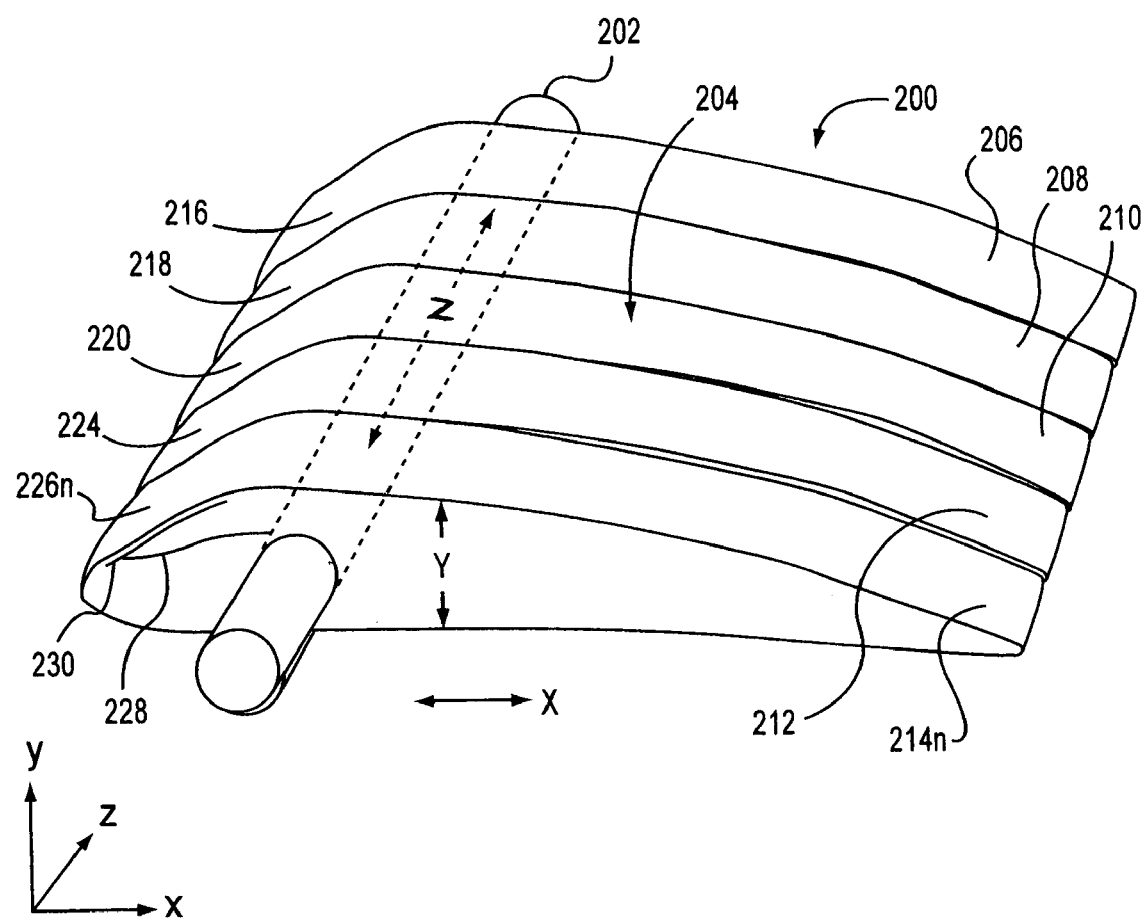
FIG. 18 is a perspective view of an EAP adaptive propeller blade capable of expanding in the XY and Z axis to provide a distributed boundary layer propulsion means.

The shape and length of propeller blades can be modified when constructed of an EAP material. Referring now to FIG. 18 a cross section of a propeller along the longitudinal length of a section of the micro propeller 200 is illustrated. An electromechanical guide tube 202 is disposed inside the longitudinal length of propeller 200 to carry the electrical leads similar to electromechanical conduit 148 in FIG. 13. The curved upper surface 204 creates a curved airfoil surface of the propeller and is composed of a plurality of individual EAP sections 206, 208, 210, 212 and 214 N which connected together form the micro propeller blade 200. Each section of the propeller blade 206-214 N is individually controlled by computer 74 to expand longitudinally to extend the length of micro propeller blade 200 as well as transversely to change the pitch as well as the profile of micro propeller blade 200 along the X, Y and Z axis.

The EAP-based adaptive micro propeller section includes rigid sections 216, 218, 220, 224 and 226 N for the leading edge of the micropropeller which is preferably constructed of a high density plastic material and may include embedded electrical heating wires 228 and heating elements 230 to remove ice from the leading edge of the micropropeller 200. The rigid sections 216, 218, 220, 224 and 226 N are utilized to maintain the shape of at least a portion of the leading edge of micropropeller 200 while the remaining EAP sections are utilized to change the pitch of the micro propeller 200 through one set of EAP actuators. A second set of EAP actuators are designed to expand in the Z direction to change the length of the propeller. Both types of subsections are designed to glide along the guide tube 202.

In a further embodiment of the invention guide tube 202 may also be constructed of an EAP material and in particular a cylindrical EAP actuator so that guide tube 202 expands and contracts together with each of the sections 206 to 214 N in which case the rigid sections 216 to 226 N are of a size less than the full length of micro propeller 200. In addition where guide tube 200 is constructed of an EAP material the leads inside tube 202 are constructed of a conductive and expandable material such as graphite powder, silicon oil/graphite mixtures as well as other elastomeric conductive materials known to those skilled in the art.

In the embodiment illustrated in FIG. 18 each of the EAP sections 206 to 214 N are mechanically constrained from rotating around the Z axis in the area of guide tube 202. Guide tube 202 may also be of a multi tube telescopic construction or an EAP material to prevent the tube from protruding beyond the blade tip. The hollow guide tube 202 allows power and control harnesses to be connected to each section 206 to 214 N. Each EAP subsection can include one or more EAP or non EAP based sensors as illustrated and discussed with respect to FIG. 16 and sensor 180. The entire blade is preferably covered with an elastomeric film to smooth out any discontinuity between the adjoining subsections and to improve the aerodynamic efficiency of the micro propeller blade 200. Adaptive distributed boundary layer propellers constructed in accordance with the invention can expand up to more than double its rest length and can vary its blade pitch as a function of the blade radius on the fly.

Referring now to FIG. 19 a schematic diagram illustrates a placement of an EAP fin 120 and an EAP propeller 200 and micro-propeller motor 76 in relation to the boundary layer thickness to the airship skin 41. As previously discussed the boundary layer thickness depends upon a number of parameters the most important of which is the degree of curvature of the airship skin. In addition to the curvature of the skin the density of the air at the deployed altitude has to be taken into account as well as the operating speed of the airship in determining the placement of the novel distributed boundary control means of the invention.

As illustrated in FIG. 19 the placement of the novel distributed boundary layer control means is determined by the boundary layer thickness in the aft section of the novel airship 70 (FIG. 11A). Where the boundary layer separation thickness is about 1 to 10 centimeters biomorph fins 8 and preferably EAP fins 120 are disposed to provide the distributed boundary layer control means as represented by arrow 250 representing the distance between the airship skin 41 and the boundary laminar-to-turbulent transition line 252. Where the boundary layer thickness increases to 10 centimeters or greater represented by arrow 254 the plurality of micropropellers 200 are disposed on the airship skin 41. Micropropellers 200 and EAP controller 124 are controlled by computer 74 as heretofore discussed and the micropropeller blades are preferably constructed of an EAP material to provide further expansion outside the 10 centimeter line 256 to provide control over and provide propulsion in boundary layer air disposed between turbulent transition line 252 and line 256.

As will be appreciated by those skilled in the art the length of the micro propeller array will vary depending upon curvature of the aircraft or airship and density of the air and speed of the aircraft or airship. In the stratospheric application of the invention the length of typical micro propellers will be about 2 to 15 centimeters in diameter and preferably be constructed of an EAP material to provide at least a doubling of the length of the propeller as well as a change in the pitch and shape of the airfoil forming the propeller.

It will be recognized by those skilled in the art that the invention can be implemented in a number of different ways to provide distributed boundary layer propulsion. As used herein the term distributed boundary layer propulsion means distributing the propulsion means within the boundary layer air that would otherwise cause drag on the aircraft or airship. The term boundary layer air propulsion means includes various types of miniature propulsion engines and propellers and fins used to provide for the propulsion of an aircraft or airship utilizing air that would otherwise contribute to drag. The use of the term boundary propulsion means does not exclude the use of conventional propulsion engines on other parts of the aircraft or airship as was discussed with respect to FIG. 11A.

Those skilled in the art will further recognize the invention may be implemented in a variety of ways without departing from the scope of the invention. It will be recognized further that not all aspects of the invention must be utilized in each and every application of the invention. For example some airships and aircraft may use only use fins, micropropellers, riblets or such components constructed from traditional metal alloys or from metallic and non metallic shape memory materials including components made from EAP materials. It will also be understood that such components may or may not include separate sensors and that airships and aircraft constructed in accordance with the invention may or may not include other flight control surfaces to control the flight of the airship or airship without using boundary layer air to control one or more of the three axis of flight of pitchs, roll and yaw.

It will be recognized the invention is capable of numerous changes and modifications by those skilled in the art. The airship may be modified to operate at various altitudes and the shape may be modified significantly while maintaining the principles of boundary layer control propulsion. The chemical compositions of polymers used for the distributed boundary layer propulsion means may be changed and modified by those skilled in the art. Further the size, shape and disposition of the propulsion means may be modified by those skilled in the art in relation to the shape of the aircraft or airship to maintain boundary layer control over the pitch, roll and yaw axis of flight. These and such other variations are intended to be included in the scope of the appended claims.

The terms airship and aircraft have been used herein and in the claims and the term airship contemplates a lighter-than-air aircraft utilizing in whole or in part a lifting gas to generate lift and as previously discussed includes hybrid aircraft. The term aircraft as used herein and in the claims contemplates a heavier than air vehicle that requires a wing along with a propulsion system to provide or maintain flight without relying upon a supplemental lifting gas. As such the invention pertains to aircraft having a convention propulsion system utilizing propellers or jet engines as well as airships with or without such conventional propulsion systems.

As used herein and in the following claims, the words "comprising" or "comprises" is used in its technical sense to mean the enumerated elements included but do not exclude additional elements which may or may not be specifically included in the dependent claims. It will be understood such additions, whether or not included in the dependent claims, are modifications that both can be made within the scope of the invention. It will be appreciated by those skilled in the art that a wide range if changes and modification can be made to the invention without departing from the spirit and scope of the invention as defined in the following claims.

TERMINOLOGY AND DESIGNATED NUMBERS

Conventional Fixed Blade Propeller 1
System 2
Micro Propellers 3
Stratospheric Airship 4
Arrow (Thrust) 5
Curved Airfoil Surface 6
Arrow 7
Fins 8
Blades 9
Shaft 10
Propeller 11
Blade 12
Lift Force 13
Hub 15
Propellers 16
Propellers 18
Propellers 20
Propeller Cluster 31
Cabeling System 32
Airship 40
Airship Skin or Body (of Airship) 41
Boundary Layer Flow 42
Turbulence Area 42A
Detached Air Flow 43
Turbulent Boundary Layer Flow 44
Onset 45
Turbulent Wake 46
Streamlined Body 51
Upstream 52
Micropropulsion Means
Micropropeller propulsion
Means 53
Micro Fin 54
Downstream Boundary Layer 55
Passive riblet film 62
Propeller 63
Solar cell panel 64
Sensor 68
Airship 70
Propeller 72
Computer 74
Miniature electric motor 76
Blunt End 77
Airship 80
Second End 81
Last Row 82
Micro propellers 94
Micro propellers 96
Micro propellers 98

Micro propellers 99
Propellers 103
Micro propellers 105
EAP fin 120
Rigid base 122
Electroactive Polymer Body 123
EAP controller 124
EAP power supply
And control circuit 126
Leads 128
EAP riblet 130
Rigid base 132
Elastomer substrate 134
Electroactive polymer
Artificial muscle (EPAM)
Biomorph layers 136, 138 and 140
Electrical leads 142, 144, 146
Electro mechanical conduit 148
Expansion layer 150
Contraction layer 152
Multiple conducting strips 151, 152, 153, 154, 155, 156, 157 and 158
Leads 159, 160, 161, 162, 163, 164, 165, 166
Electrical harness 168
EAP biomorph layers 170, 171, 172, 173, 174, 175, 176, 178, 179
Outermost layer 180
Pressure/stress sensing
Layer
EAP propeller 200
or
Micropropeller 200
Micropropeller blade
Electromechanical guide
Tube 202
or Guide tube
Curved upper surface 204
EAP sections 206, 208, 210, 212 and 214 n
Or propeller blade
Rigid sections 216, 218, 220, 224 and 226 n
Embedded electrical
Heating wires 228
Heating element 230
Arrow 250
Boundary laminar-to-
Turbulent transition line 252
Boundary layer thickness
Increase to 10 cm 254
Expansion beyond 10 cm
Line

What is claimed is:

1. A boundary layer propelled airship comprising:
   (a) a curved airship skin having a fore section and a curved aft section; and
   (b) a distributed boundary layer propulsion means disposed in said curved aft section having at least one member of said distributed boundary layer propulsion means disposed inside a boundary layer separation area said distributed boundary layer propulsion means selected from the group consisting of:
      a plurality of micropropellers having a diameter less than the thickness of a boundary layer;
      a plurality of piezoelectric biomorph fins;
      a plurality of electroactive polymer propellers having a diameter less than the thickness of the boundary layer; and
      a plurality of electroactive polymer riblets.

2. The boundary layer propelled airship of claim 1 further comprising a passive riblet film disposed on said curved airship skin.

3. The boundary layer propelled airship of claim 1 further comprising a passive riblet film is disposed on said curved aft section of the airship skin.

4. The boundary layered propelled airship of claim 3 wherein said boundary layer propulsion means is disposed aft of said passive riblet film.

5. The boundary layer propelled airship of claim 3 wherein said boundary layer propulsion means is said plurality of electroactive polymer riblets disposed aft of said passive riblet film.

6. The boundary layer propelled airship of claim 5 wherein said boundary layer propulsion means further comprises said plurality of electroactive polymer propellers disposed aft of said plurality of electroactive polymer riblets.

7. The boundary layer propelled airship of claim 6 wherein said aft section terminates in a propeller.

8. The boundary layer propelled airship of claim 6 wherein said aft section terminates in a blunt end.

9. An airship having a boundary layer assisted propulsion system comprising:
   (a) an elongated airship having a skin with a frontal area and a rearward area;
   (b) a passive drag reducing film disposed on said skin between said frontal area and said rearward area;
   (c) a propulsion area having an electroactive polymer propulsion device disposed inside a boundary layer separation area on said skin between said passive drag reducing film and said rearward area; and
   (d) electrical contacts connecting said electroactive polymer to an electric propulsion system.

10. The airship of claim 9 further comprising an electroactive polymer controller connected to said electrical contacts through said skin.

11. The airship of claim 10 further comprising an electroactive polymer power supply and control circuit connected to said electrical contacts.

12. The airship of claim 9 wherein said electroactive polymer includes a plurality of electroactive polymer micropropellers.

13. The airship of claim 12 wherein said electrical contacts are composed of an elastomeric material containing graphite powder.

14. The airship of claim 9 further comprising an electroactive polymer pressure/stress sensing layer disposed on said skin.

15. The airship of claim 9 wherein said electroactive polymer is an electroactive polymer fin.

16. The airship of claim 9 wherein said electroactive polymer is an electroactive polymer riblet.

17. The airship of claim 9 wherein said electroactive polymer is a propeller.

18. The airship of claim 17 wherein said electroactive polymer includes a polymer pressure/stress sensing layer disposed on said propeller.

19. A high altitude dirigible having reduced drag comprising:
   (a) an elongated dirigible body having a curved skin with a fore section and an aft section;
   (b) a passive riblet film disposed between said fore section and said aft section of said curved skin;
   (c) an electroactive polymer propulsion device disposed inside a boundary layer between said passive riblet film and said aft section of said curved skin; and (d) a computer to control the operation of said electroactive polymer area.

20. The dirigible of claim 19 further comprising a layer of solar cells to provide electrical power for said electroactive polymer propulsion device.

21. The dirigible of claim 20 wherein said electroactive polymer device is the plurality of small propellers with a diameter of about 2 to 15 centimeters.

22. The dirigible of claim 20 wherein said electroactive polymer device is the plurality of piezoelectric biomorph fins.

23. The dirigible of claim 20 wherein said electroactive polymer device is the plurality of electroactive polymer propellers.

24. The dirigible of claim 20 wherein said electroactive polymer device is the plurality of electroactive riblets.

* * * * *